United States Patent
Agiwal

(10) Patent No.: US 11,064,533 B2
(45) Date of Patent: Jul. 13, 2021

(54) METHOD AND APPARATUS FOR DETERMINING CHANNEL ACCESS TYPE IN WIRELESS COMMUNICATION SYSTEM

(71) Applicant: Samsung Electronics Co., Ltd., Gyeonggi-do (KR)

(72) Inventor: Anil Agiwal, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/536,908

(22) Filed: Aug. 9, 2019

(65) Prior Publication Data

US 2020/0059969 A1 Feb. 20, 2020

Related U.S. Application Data

(60) Provisional application No. 62/718,688, filed on Aug. 14, 2018.

(51) Int. Cl.
*H04W 74/08* (2009.01)
*H04W 72/04* (2009.01)

(52) U.S. Cl.
CPC ..... *H04W 74/0833* (2013.01); *H04W 72/042* (2013.01)

(58) Field of Classification Search
CPC ............. H04W 72/042; H04W 74/006; H04W 74/0833
See application file for complete search history.

(56) References Cited

U.S. PATENT DOCUMENTS

2016/0021629 A1 1/2016 Jang et al.
2017/0006640 A1 1/2017 Dinan
(Continued)

FOREIGN PATENT DOCUMENTS

WO WO 2017/135803 8/2017
WO WO 2017/136458 8/2017

OTHER PUBLICATIONS

Huawei, HiSilicon, "Correction on LBT Type for eLAA", R2-1701222, 3GPP TSG-RAN WG2 Meeting #97, Feb. 13-17, 2017, 3 pages.
(Continued)

*Primary Examiner* — Saad A. Waqas
(74) *Attorney, Agent, or Firm* — The Farrell Law Firm, P.C.

(57) ABSTRACT

The disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The disclosure provides method and apparatus for determining channel access procedure type for Msg3 transmission. The method includes receiving, from a base station, a random access response (RAR) including first information on a type of a channel access procedure for transmitting a msg3 of a random access procedure; performing the channel access procedure based on the first information; and transmitting, to the base station, the msg3 of the random access procedure based on a result of the channel access procedure.

24 Claims, 20 Drawing Sheets

(56) References Cited

U.S. PATENT DOCUMENTS

| | | |
|---|---|---|
| 2017/0222749 A1* | 8/2017 | Dinan .................... H04L 1/001 |
| 2017/0231011 A1 | 8/2017 | Park et al. |
| 2017/0238334 A1 | 8/2017 | Yang et al. |
| 2020/0008240 A1* | 1/2020 | Golitschek Edler von Elbwart .............. H04W 72/042 |
| 2020/0037361 A1* | 1/2020 | Chakraborty ......... H04W 16/14 |
| 2020/0053772 A1* | 2/2020 | Pan .................... H04W 74/006 |
| 2020/0053777 A1* | 2/2020 | Babaei ................ H04W 72/042 |

OTHER PUBLICATIONS

International Search Report dated Nov. 13, 2019 issued in counterpart application No. PCT/KR2019/009924, 8 pages.
Lenovo, Motorola Mobility, "Extensions for Channel Access Procedures", R1-1809300, 3GPP TSG RAN WG1 Meeting 94, Aug. 20-24, 2018, 3 pages.
Motorola Mobility, Lenovo, "Modifications to RACH Procedure due to LBT", R2-1811416, 3GPP TSG RAN WG2 Meeting 103, Aug. 20-24, 2018, 4 pages.
European Search Report dated May 11, 2021 issued in counterpart application No. 19849609.3-1215, 9 pages.

* cited by examiner

METHOD AND APPARATUS FOR DETERMINING CHANNEL ACCESS TYPE IN WIRELESS COMMUNICATION SYSTEM

CROSS-REFERENCE TO RELATED APPLICATION(S)

This application is based on and claims priority under 35 U.S.C. § 119(e) to a U.S. Provisional Patent Application Ser. No. 62/718,688, which was filed in the U.S. Patent and Trademark Office on Aug. 14, 2018, the entire content of which is incorporated herein by reference.

BACKGROUND

1. Field

The disclosure relates generally to a wireless communication system, and more particularly, to an apparatus, a method, and a system for determining a channel access type for a message 3 (msg3) transmission in an unlicensed band during a random access procedure in a wireless communication system.

2. Description of Related Art

To meet the increasing demand for wireless data traffic since deployment of $4^{th}$ generation (4G) communication systems, efforts have been made to develop an improved $5^{th}$ generation (5G) or pre-5G communication system, which may be referred to as a "beyond 4G network" or a "post long-term evolution (LTE) system". The 5G communication system will be implemented using higher frequency (mm-Wave) bands, e.g., 60 GHz bands, in order to utilize higher data rates.

To decrease propagation loss of radio waves and increase transmission distances, beamforming, massive multiple-input multiple-output (MIMO), full dimensional MIMO (FD-MIMO), array antennas, analog beam forming, and large scale antenna techniques are being discussed for use in 5G communication systems. In addition, in 5G communication systems, system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation, etc.

In the 5G system, hybrid frequency-shift keying (FSK) and quadrature amplitude modulation (QAM) (FQAM) and sliding window superposition coding (SWSC) have been developed as an advanced coding modulation (ACM), and filter bank multi carrier (FBMC), non-orthogonal multiple access (NOMA), and sparse code multiple access (SCMA) have been developed as an advanced access technology.

The Internet is now evolving to the Internet of things (IoT) where distributed entities, such as things, exchange and process information without human intervention. The Internet of everything (IoE), which is a combination of the IoT technology and big data processing technology through connection with a cloud server, has also emerged.

As technology elements, such as "sensing technology", "wired/wireless communication and network infrastructure", "service interface technology", and "security technology" have been demanded for IoT implementation, a sensor network, machine-to-machine (M2M) communication, machine type communication (MTC), etc., have been recently researched. Such an IoT environment may provide intelligent Internet technology services that create a new value to human life by collecting and analyzing data generated among connected things. IoT may be applied to a variety of fields including smart homes, smart buildings, smart cities, smart cars or connected cars, smart grids, health care, smart appliances, and advanced medical services through convergence and combination between existing information technology (IT) and various industrial applications.

Various attempts have also been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

Recently, several broadband wireless technologies have been developed to meet the growing number of broadband subscribers and to provide more and better applications and services. The 2nd generation (2G) wireless communication system was developed to provide voice services while ensuring the mobility of users. The $3^{rd}$ generation (3G) wireless communication system was developed to support voice service and data service. The 4G wireless communication system was developed to provide high-speed data service. However, the 4G wireless communication system does not have sufficient resources to meet the growing demand for high speed data services. Accordingly, the 5G wireless communication system is being developed to meet the growing demand for high speed data services, and to support ultra-reliability and low latency applications.

In addition, the 5G wireless communication system is expected to address different uses having different requirements in terms of data rates, latency, reliability, mobility, etc. Accordingly, it is expected that a design of an air-interface of the 5G wireless communication system will be flexible enough to serve user equipments (UEs) having different capabilities, based on the use and market segment for which the UE will provide service to the end customer. Few example, the 5G wireless communication system wireless system is expected to address enhanced mobile broadband (eMBB), massive MTC (m-MTC), ultra-reliable low latency communication (URLL), etc. The eMBB requirements, such as a tens of Gbps data rate, low latency, high mobility, etc., address a market segment representing conventional wireless broadband subscribers needing Internet connectivity at all times. The m-MTC requirements, such as a very high connection density, infrequent data transmission, a very long battery life, a low mobility address, etc., address a market segment representing the IoT/IoE, envisioning connectivity of billions of devices. The URLL requirements, such as very low latency, very high reliability, variable mobility, etc., address a market segment representing industrial automation applications and vehicle-to-vehicle/vehicle-to-infrastructure communication, which is expected to be important for autonomous cars.

In the 4G wireless communication system, the eNB is responsible for maintaining a timing advance in a radio resource control (RRC)_CONNECTED state. In the RRC_CONNECTED state, the UE may be configured with one or more serving cells. Serving cells having an uplink (UL) to which the same timing advance applies (typically corresponding to the serving cells hosted by the same receiver) and using a same timing reference cell are grouped in a timing advance group (TAG). Each TAG includes at least one serving cell with a configured UL, and the mapping of each serving cell to a TAG is configured by an RRC.

For dual connectivity (DC), a TAG only includes cells that are associated to the same cell group (CG) and a maximum number of TAGs is 8.

For a primary TAG (pTAG) the UE uses a primary cell (PCell) in a master cell group (MCG) and a primary secondary cell (PSCell) in a secondary cell group (SCG) as a timing reference.

In a secondary TAG (sTAG), the UE may use any of the activated SCells of the sTAG as a timing reference cell. The synchronization status of the UE follows the synchronization status of the pTAG of the MCG. The synchronization status of the UE, with respect to the SCG, follows the synchronization status of the pTAG of the SCG.

When a timer associated with a pTAG is not running, a timer associated with an sTAG in that CG shall not be running Expiry of the timers associated with one CG does not affect the operation of the other CG. The value of the timer associated to the pTAG of the MCG may be UE specific and managed through dedicated signaling between the UE and the eNB, or may be cell specific and indicated via broadcast information. In both cases, the timer is normally restarted each time a new timing advance is provided by the eNB for the pTAG: restarted to a UE specific value if any; or restarted to a cell specific value otherwise.

The value of the timer associated to a pTAG of an SCG and the value of a timer associated to an sTAG of an MCG or an sTAG of an SCG are managed through dedicated signaling between the UE and the eNB, and the timers associated to these TAGs can be configured with different values. The timers of these TAGs are normally restarted each time a new timing advance is given by the eNB for the corresponding TAG.

The issue with the current design is that a synchronization status of the UE follows a synchronization status of a pTAG. Accordingly, if a time alignment timer (TAT) for a pTAG expires, the TATs of all of the TAGs are also considered to be expired. Consequently, communication on serving cells of sTAG(s) is unnecessarily delayed until the completion of a) Random Access procedure for pTAG, and b) Random access procedure for STAG. Therefore, a method is needed to avoid this type of delay.

The 5G wireless communication system should also support operation on licensed and unlicensed carriers. Using an unlicensed carrier may reduce capital expenditures for cellular operators by utilizing free spectrum access for intelligent data offloading, and provide improved and intelligent spectrum access and management, which addresses increasing wireless traffic demand under limited available spectrum and allows network operators without a licensed spectrum to utilize the radio efficient $3^{rd}$ generation partnership project (3GPP) radio access technology.

Various deployment scenarios are being considered for operation on unlicensed carriers, such as:

New radio (NR)-unlicensed (U) license assisted access (LAA): Carrier aggregation between licensed band NR (PCell) and unlicensed band NR-U (SCell).

NR-U stand-alone (SA): Stand-alone NR-U.

Evolved terrestrial radio access network (E-UTRAN) new radio unlicensed (ENU)-DC: Dual connectivity between licensed band LTE (PCell) and unlicensed band NR-U (PSCell).

NR unlicensed (NNU)-DC: Dual connectivity between licensed band NR (PCell) and unlicensed band NR-U (PSCell).

The scenarios above include an NR cell with a downlink (DL) in an unlicensed band and a UL in an licensed band.

A listen-before-talk (LBT) procedure is utilized for fair and friendly coexistence of devices and technologies operating in unlicensed spectrum. LBT procedures on a node attempting to transmit on a carrier in unlicensed spectrum require the node to perform a clear channel assessment to determine if the channel is free for use. Various types or categories of LBT procedures used for transmission are as follows:

Category 1: No LBT

No LBT procedure is performed by the transmitting entity.

Category 2: LBT Without Random Back-Off

The duration for which the channel is sensed to be idle before the transmitting entity transmits is deterministic. For example, a sensing interval can be 25 us, i.e., a UE can transmit, after sensing the channel to be idle for at least a sensing interval Td=25 us. For UL transmission, category 2 may also be referred as a Type 2 channel access procedure.

Category 3: LBT with Random Back-Off with a Contention Window of Fixed Size

In this LBT procedure, the transmitting entity draws a random number N within a contention window. The size of the contention window is specified by a minimum value and a maximum value of N. The size of the contention window is fixed. The random number N is used in the LBT procedure to determine the duration for which the channel is sensed to be idle, before the transmitting entity transmits on the channel A detailed category 3 LBT procedure is as follows:

A UE transmits after sensing the channel to be idle during the slot durations of a defer duration (Td) and after the counter is zero in step 4 below. The detailed procedure is as follows:

Step 1: set $N=N_{init}$, where $N_{init}$ is a random number uniformly distributed between 0 and contention window (CW)p. CWp is the contention window for a given channel access priority class 'p'. The various LBT parameters for different channel access priority classes (CAPC) are listed in Table 1 below.

TABLE 1

| Channel Access Priority Class (p) | $m_p$ | $CW_{min,p}$ | $CW_{max,p}$ | $T_{mcot,p}$ | Allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

If the absence of any other technology sharing, the carrier can be guaranteed on a long term basis (e.g., by level of regulation), the maximum channel occupancy time for LBT priority classes 3 and 4 is 10 msec. Otherwise, maximum channel occupancy time for LBT priority classes 3 and 4 is for 8 msec.

Step 2: if N>0, decrement the counter, set N=N−1.

Step 3: Sense the channel for an additional slot duration (Ts). If the additional slot duration is idle, go to step 4; else, go to step 5.

Step 4: if N=0, perform transmission; else, go to step 2.

Step 5: sense the channel during the slot durations of an additional defer duration (Td). Td is equal to $T_f+m_p×Ts$, where $T_f$ is equal to 16 us and Ts is equal to 9 us and $m_p$ corresponds to the table 1.

Step 6: If the channel is sensed to be idle during Td, go to step 2; else, go to step 5.

Category 4: LBT with Random Back-Off with a Contention Window of Variable Size

In this LBT procedure, the transmitting entity draws a random number N within a contention window. The size of contention window is specified by a minimum value and a maximum value of N. The transmitting entity can vary the size of the contention window when drawing the random number N. The random number N is used in the LBT procedure to determine the duration for which the channel is sensed to be idle before the transmitting entity transmits on the channel. The detailed procedure is same as category 3, except that in category 3, the size of contention window is fixed, whereas in category 4, the transmitting entity can vary the size of the contention window when drawing the random number N. For UL transmission, category 4 may also be referred to as a Type 1 channel access procedure.

In the 4G wireless communication system, communication in an unlicensed band is performed with respect to an LBT procedure or a channel access procedure. The LBT type to be used for a transmission of physical uplink shared channel (PUSCH) is indicated in physical downlink control channel (PDCCH) (i.e., in downlink control information (DCI)). However, in a 5G wireless communication system, a random access procedure needs to be supported on the unlicensed band (or an unlicensed carrier). During the random access procedure, Msg1 is transmitted in a UL. For Msg1, i.e., a random access preamble transmission, the LBT category/type to be used for channel access is pre-defined.

Msg3 also needs to be transmitted during the contention based random access procedure. Msg3 includes a common control channel (CCCH) service data unit (SDU), a cell radio network temporary identifier (C-RNTI), or medium access control (MAC) control element (CE). Additionally, a buffer status report (BSR)/power headroom report (PHR), etc., may also be included if available.

For scheduling an initial transmission of the Msg3, PDCCH is not transmitted by a base station (gnodeB (gNB)), which creates an issue as to how the UE can determine the LBT type/category to be used for Msg3 transmission.

SUMMARY

The disclosure is made to address at least the problems and/or disadvantages described above and to provide at least the advantages described below.

In accordance with an aspect of the disclosure, a method by a terminal is provided. The method includes receiving, from a base station, a random access response (RAR) including first information on a type of a channel access procedure for transmitting a msg3 of a random access procedure, performing the channel access procedure based on the first information, and transmitting, to the base station, the msg3 of the random access procedure based on a result of the channel access procedure.

In accordance with another aspect of the disclosure, a method by a base station is provided. The method includes transmitting, to a terminal, a random access response (RAR) including first information on a type of a channel access procedure for transmitting a msg3 of a random access procedure, and receiving, from the terminal, the msg3 of the random access procedure based on a result of the channel access procedure, which is performed based on the first information.

In accordance with another aspect of the disclosure, a terminal is provided, which includes a transceiver and a controller coupled with the transceiver and configured to receive, from a base station, a random access response (RAR) including first information on a type of a channel access procedure for transmitting a msg3 of a random access procedure, perform the channel access procedure based on the first information, and transmit, to the base station, the msg3 of the random access procedure based on a result of the channel access procedure.

In accordance with another aspect of the disclosure, a base station is provided, which includes a transceiver and a controller coupled with the transceiver and configured to transmit, to a terminal, a random access response (RAR) including first information on a type of a channel access procedure for transmitting a msg3 of a random access procedure, and receive, from the terminal, the msg3 of the random access procedure based on a result of the channel access procedure, which is performed based on the first information.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
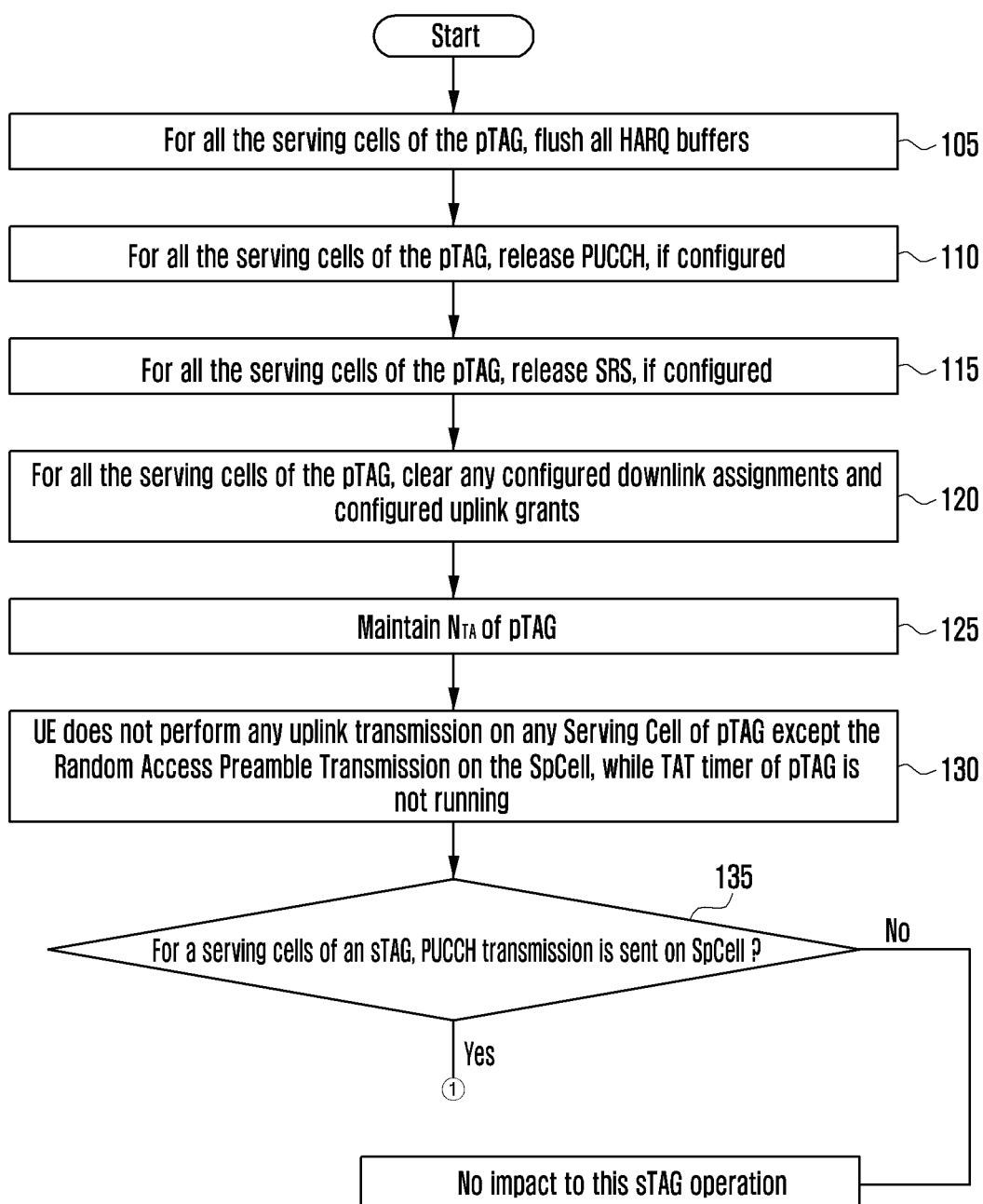
FIG. 1A is a flowchart illustrating a method of handling an expiry of a TAT for a pTAG according to an embodiment.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are used to enable a clear and consistent understanding of the disclosure. Accordingly, the following description of various embodiments of the disclosure is provided for illustration purposes only and not for the purpose of limiting the disclosure as defined by the appended claims and their equivalents.

Singular forms, such as "a," "an," and "the", include plural referents unless the context clearly dictates otherwise. Thus, for example, reference to "a component surface" includes reference to one or more of such surfaces.

The term "substantially" may meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Blocks of the flowcharts (or sequence diagrams) and a combination of flowcharts may be represented and executed by computer program instructions. These computer program instructions may be loaded on a processor of a general purpose computer, special purpose computer, or programmable data processing equipment. When the loaded program instructions are executed by the processor, they create a device for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the illustrated order. For example, two blocks illustrated in sequence may be executed at the same time or executed in reverse order.

The words "unit", "module", or the like may refer to a software component or hardware component, such as a field-programmable gate array (FPGA) or an application-specific integrated circuit (ASIC) capable of carrying out a function or an operation. However, a "unit", or the like, is not limited to hardware or software. A unit, or the like, may be configured to reside in an addressable storage medium or to drive one or more processors. Units, or the like, may also refer to software components, object-oriented software components, class components, task components, processes, functions, attributes, procedures, subroutines, program code segments, drivers, firmware, microcode, circuits, data, databases, data structures, tables, arrays, or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

A "base station (BS)" is an entity communicating with a UE and may be referred to a base transceiver station (BTS), a node B (NB), an evolved NB (eNB), a 5G NB (5GNB), gNB, an access point (AP), or a transmission and reception point (TRP).

A "UE" is an entity communicating with a BS and may be referred to a device, a mobile station (MS), a mobile equipment (ME), or a terminal.

Embodiment 1-1

A UE in an RRC CONNECTED state is configured with multiple serving cells by at least one base station. The UE is also configured with at least one pTAG and at least one sTAG. The UE is also configured with a value of timeAlignmentTimer (TAT, or TAT timer) associated with each of the configured TAGs.

Upon receiving a timing advance command (TAC) in a random access response (RAR) message for a serving cell belonging to a TAG, if the random access preamble was not selected by the MAC entity in the UE, among the contention-based random access preambles, or if the timeAlignmentTimer is not running for this TAG, the MAC entity in the UE starts the timeAlignmentTimer associated with this TAG.

If the MAC entity in the UE receives a TAC MAC CE, and if an $N_{TA}$ (as defined in the 3GPP TS 38.211) has been maintained with the indicated TAG, the MAC entity in the UE starts or restarts the timeAlignmentTimer associated with the indicated TAG. In this embodiment, upon expiry of the timeAlignmentTimer associated with the pTAG, the UE performs the following operation (as illustrated in FIGS. 1A and 1B).

Figure 1B:
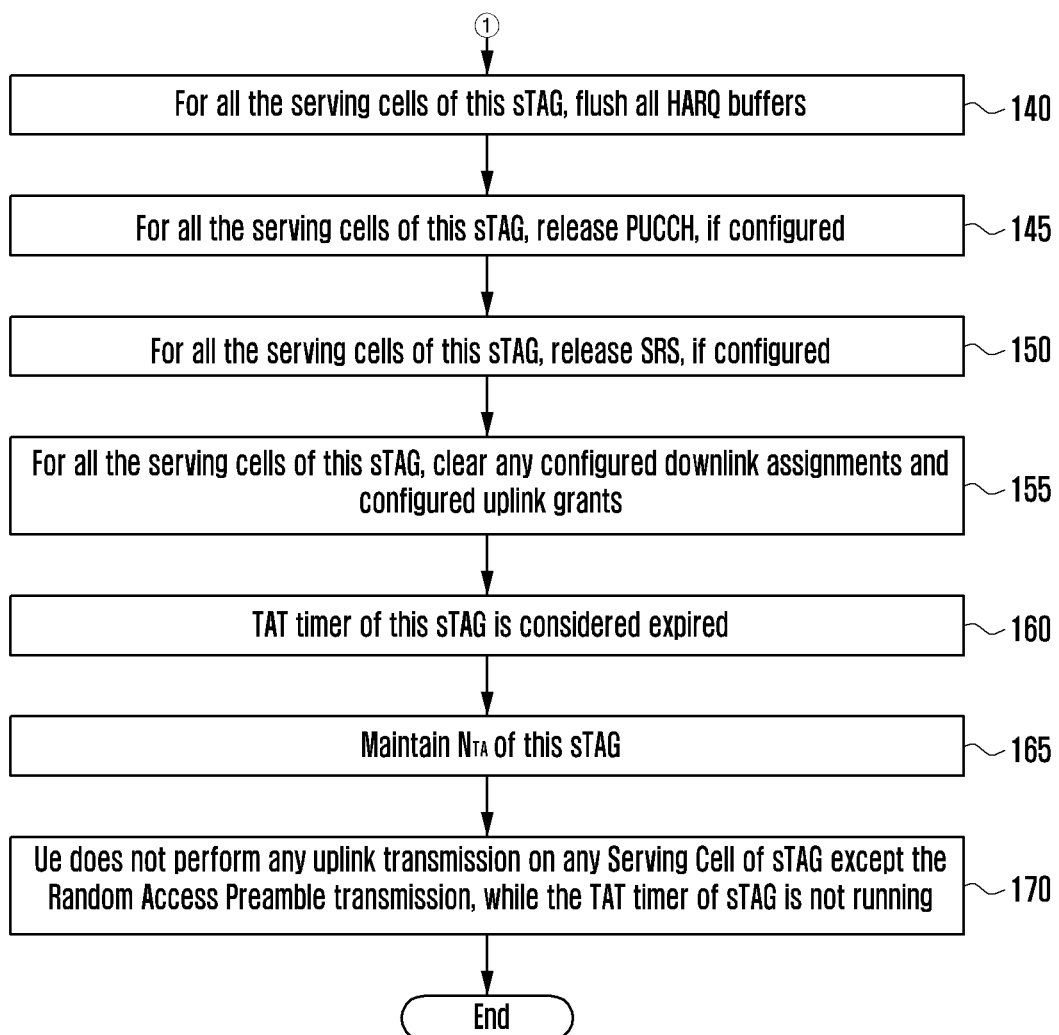
FIG. 1B is a flowchart illustrating a method of handling an expiry of a TAT for a pTAG according to an embodiment.

FIGS. 1A and 1B are a flowchart illustrating a method of handling an expiry of a TAT for a pTAG according to an embodiment.

Referring to FIGS. 1A and 1B:

1. For all the serving cells of the pTAG, the UE will:
   a. flush all hybrid automatic repeat request (HARQ) buffers; release physical uplink control channel (PUCCH), if configured; release sounding reference signal (SRS), if configured (steps 105, 110, and 115); and b. clear any configured downlink assignments and configured uplink grants (step 120).

2. The UE maintains $N_{TA}$ of pTAG (step 125).

3. the UE does not perform any uplink transmission on any serving cell of the pTAG, except the random access preamble transmission on a special cell (SpCell) (which refers to a PCell for a pTAG of an MCG or to a PSCell for a pTAG of an SCG), until the pTAG is UL synchronized. The UE does not perform any uplink transmission on any serving cell of the pTAG, except the random access preamble transmission on the SpCell, while the TAT timer of the pTAG is not running (step 130).

4. For each sTAG, the UE checks whether or not a PUCCH transmission is sent on an SpCell for any of the serving cells associated with this sTAG (step 135). For an sTAG, if a PUCCH transmission is sent on the SpCell for any of the serving cells associated with this sTAG, then, for this sTAG, the UE will:

a. flush all HARQ buffers for all serving cells of this TAG (step 140);

b. release the PUCCH for all serving cells of this TAG, if configured (step 145);

c. release the SRS for all serving cells of this TAG, if configured (step 150);

d. clear any configured downlink assignments and configured uplink grants for all serving cells of this TAG (step 155);

e. consider the timeAlignmentTimer as expired (step 160);

f. maintain $N_{TA}$ of this TAG (step 165); and g. when the timeAlignmentTimer associated with this TAG is not running, the UE shall not perform any uplink transmission on any serving cell of this TAG, except the random access preamble transmission. The UE does not perform any uplink transmission on any serving cell of this TAG, except the random access preamble transmission, until the pTAG is UL synchronized (step 170).

For example, when the UE is configured with two sTAGs (sTAG1 and sTAG2), wherein sTAG1 comprises cell 1, cell 2, and cell 3 and sTAG2 comprises cell 4, cell 5, and cell 6, a PUCCH transmission for cell 2 may be sent on SpCell. In this example, the UE will perform operations a.-g. above for the sTAG1 upon expiry of the timeAlignmentTimer associated with the pTAG. However, the operations a.-g. above are not performed for the sTAG2. Accordingly, there is no interruption of data communication on the serving cells of the sTAG2.

In the above-described embodiment, upon expiry of the pTAG TAT, the network (e.g., a gNB) initiates random access (e.g., transmits a PDCCH order on an SpCell). For an sTAG, upon expiry of the pTAG TAT, the network initiates the random access by transmitting the PDCCH order only if a PUCCH transmission is performed on an SpCell for any of the serving cells of this sTAG.

Embodiment 1-2

A UE in an RRC CONNECTED state is configured with multiple serving cells by at least one base station. The UE is also configured with at least one pTAG and one sTAG. The UE is also configured with a value of timeAlignmentTimer (TAT) timers associated with the configured TAGs.

Upon receiving a TAC in a random access response message for a serving cell belonging to a TAG, if the random access preamble was not selected by a MAC entity in the UE among the contention-based random access preambles or if the timeAlignmentTimer is not running for this TAG, the MAC entity in the UE starts the timeAlignmentTimer associated with this TAG. If the MAC entity in the UE receives a TAC MAC CE, and if an $N_{TA}$ (as defined in the 3GPP TS 38.211) has been maintained with the indicated TAG, the MAC entity in the UE starts or restarts the timeAlignmentTimer associated with the indicated TAG. In this embodiment, upon expiry of timeAlignmentTimer associated with the pTAG, the UE performs the following operation (as illustrated in FIG. 2).

Figure 2:
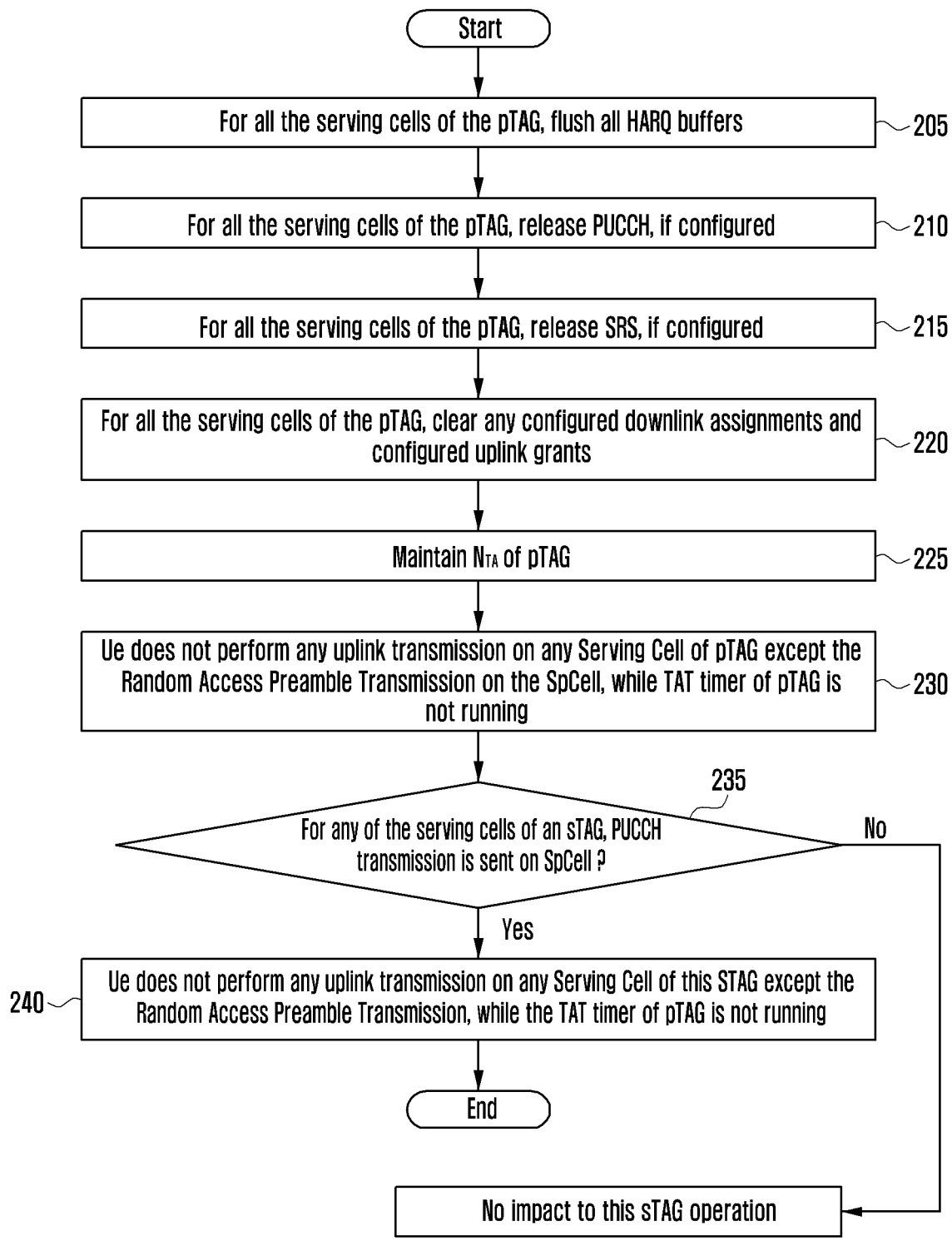
FIG. 2 is a flowchart illustrating a method of handling an expiry of a TAT for a pTAG according to an embodiment.

FIG. 2 is a flowchart illustrating a method of handling an expiry of a TAT for a pTAG according to an embodiment. Referring to FIG. 2:

1. For all the serving cells of the pTAG, the UE will:
   a. flush all HARQ buffers (step 205);
   b. release PUCCH, if configured (step 210);
   c. release SRS, if configured (step 215); and
   d. clear any configured downlink assignments and configured uplink grants (step 220).

2. The UE maintains $N_{TA}$ of the pTAG (step 225).

3. The UE does not perform any uplink transmission on any serving cell of the pTAG, except the random access preamble transmission on the SpCell, until the pTAG is UL synchronized. The UE does not perform any uplink transmission on any serving cell of the pTAG except the random access preamble transmission on the SpCell, while the TAT timer of the pTAG is not running (step 230).

4. For each sTAG, the UE checks if a PUCCH transmission is sent on SpCell for any of the serving cell associated with this sTAG (step 235). If the PUCCH transmission is sent on the SpCell for any of the serving cells associated with this sTAG, then for this sTAG:

a. when the timeAlignmentTimer associated with the pTAG is not running, the UE shall not perform any uplink transmission on any serving cell of this TAG, except the random access preamble transmission. In other words, the UE stops UL transmission on all serving cells of this TAG until the pTAG is UL synchronized (step 240).

For example, when the UE is configured with two sTAGs (sTAG1 and sTAG2), wherein sTAG1 comprises cell 1, cell 2, and cell 3 and sTAG2 comprises cell 4, cell 5, and cell 6, a PUCCH transmission for cell 2 may be sent on the SpCell. In this example, the UE will stop UL transmissions on any serving cells of the sTAG1, until the pTAG is UL synchronized. Accordingly, there is no interruption of data communication on the serving cells of the sTAG2.

In this embodiment, upon expiry of the pTAG TAT, the network (e.g., a gNB) initiates random access (e.g., transmits a PDCCH order on the SpCell). For an sTAG, upon expiry of the pTAG TAT, the network does not initiate random access, i.e., it does not transmit the PDCCH order.

Embodiment 1-3

A UE in an RRC CONNECTED state is configured with multiple serving cells by at least one base station. The UE is also configured with at least one pTAG and one sTAG. The UE is also configured with the value of timeAlignmentTimer (TAT) timers associated with the configured TAGs.

Upon receiving a TAC in a random access response message for a serving cell belonging to a TAG, if the random access preamble was not selected by a MAC entity in the UE, among the contention-based random access preambles or if the timeAlignmentTimer is not running for this TAG, the MAC entity in the UE starts the timeAlignmentTimer associated with this TAG.

If the MAC entity in the UE receives a TAC MAC CE, and if an $N_{TA}$ (as defined in the 3GPP TS 38.211) has been maintained with the indicated TAG, the MAC entity in the UE starts or restarts the timeAlignmentTimer associated with the indicated TAG.

Figure 3:
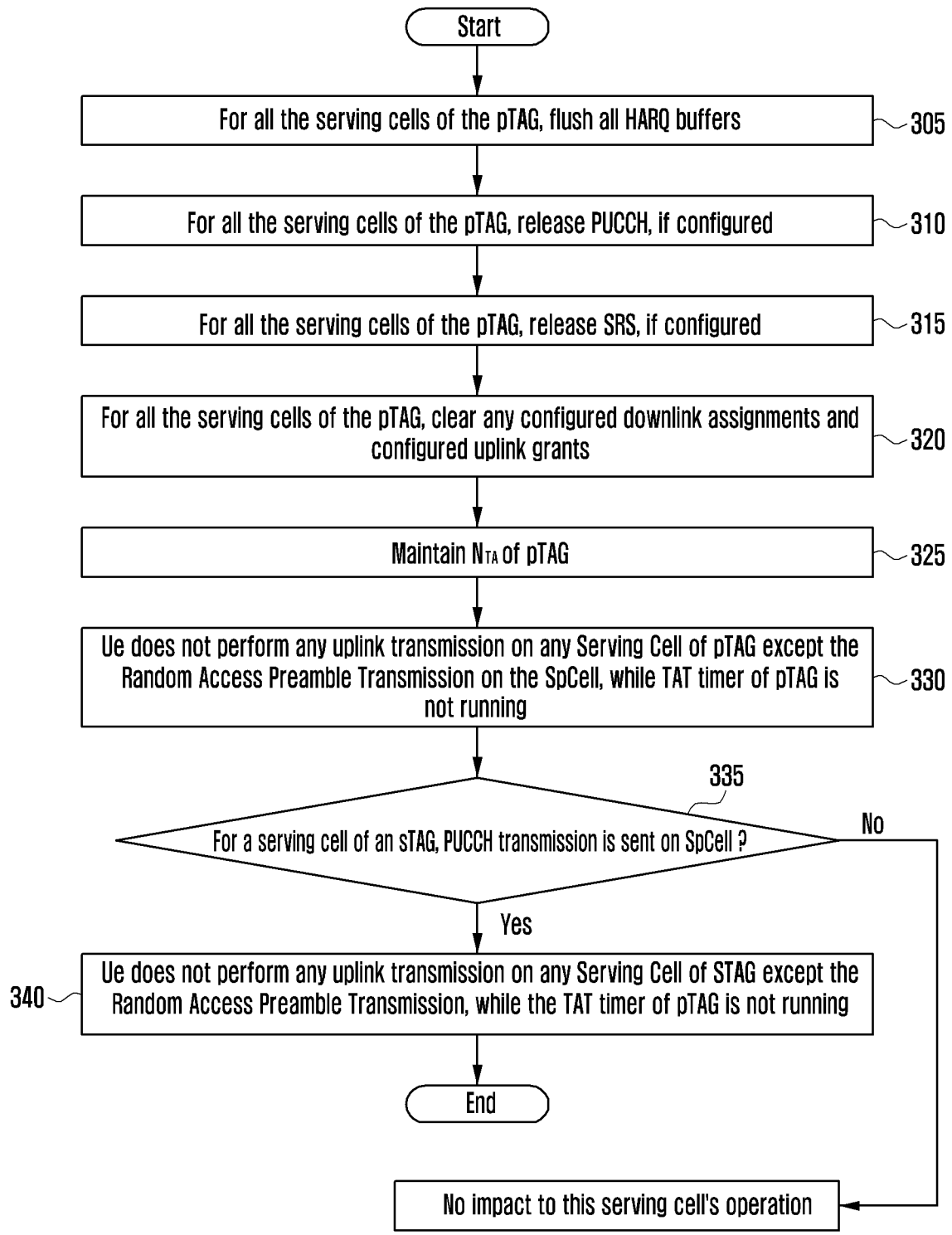
FIG. 3 is a flowchart illustrating a method of handling an expiry of a TAT for a pTAG according to an embodiment.

In this embodiment, upon expiry of timeAlignmentTimer associated with the pTAG, the UE performs the following operations (as illustrated in FIG. 3).

FIG. 3 is a flowchart illustrating a method of handling an expiry of a TAT for a pTAG according to an embodiment.

Referring to FIG. 3:

1. For all the serving cells of the pTAG, the UE will:
   a. flush all HARQ buffers (step 305);
   b. release the PUCCH, if configured (step 310);
   c. release the SRS, if configured (step 315); and
   d. clear any configured downlink assignments and configured uplink grants (step 320).
2. The UE maintains $N_{TA}$ of the pTAG (step 325).
3. The UE does not perform any uplink transmission on any serving cell of the pTAG, except the random access preamble transmission on the SpCell, until the pTAG is UL synchronized. The UE does not perform any uplink transmission on any serving cell of the pTAG, except the random access preamble transmission on the SpCell, while the TAT timer of the pTAG is not running (step 330).
4. For each serving cell associated with an sTAG, the UE checks if a PUCCH transmission for that serving cell is sent on the SpCell (step 335). If yes, then for this serving cell, when the timeAlignmentTimer associated with pTAG is not running, the UE shall not perform any uplink transmission on this serving cell, except the random access preamble transmission. In other words, the UE stops UL transmissions on this serving cell, until the pTAG is UL synchronized (step 340).

For example, when UE is configured with two sTAGs (sTAG1 and sTAG2), wherein sTAG1 comprises cell 1, cell 2, and cell 3 and sTAG2 comprises cell 4, cell 5, and cell 6, a PUCCH transmission for cell 2 may be sent on the SpCell. In this example, the UE will stop UL transmissions on cell 2 of the sTAG1, until the pTAG is UL synchronized. However, there are no interruptions of data communication on serving cells cell 1, cell 3, cell 4, cell 5, and cell 6.

Embodiment 1-4

A UE in an RRC CONNECTED state is configured with multiple serving cells by at least one base station. The UE is also configured with at least one pTAG and one sTAG. The UE is also configured with the value of timeAlignmentTimer (TAT) timers associated with the configured TAGs.

Upon receiving a TAC in a random access response message for a serving cell belonging to a TAG, if the random access preamble was not selected by a MAC entity in the UE, among the contention-based random access preambles or if the timeAlignmentTimer is not running for this TAG, the MAC entity in the UE starts the timeAlignmentTimer associated with this TAG. If the MAC entity in the UE receives a TAC MAC CE, and if an $N_{TA}$ (as defined in the 3GPP TS 38.211) has been maintained with the indicated TAG, the MAC entity in the UE starts or restarts the timeAlignmentTimer associated with the indicated TAG.

Figure 4:
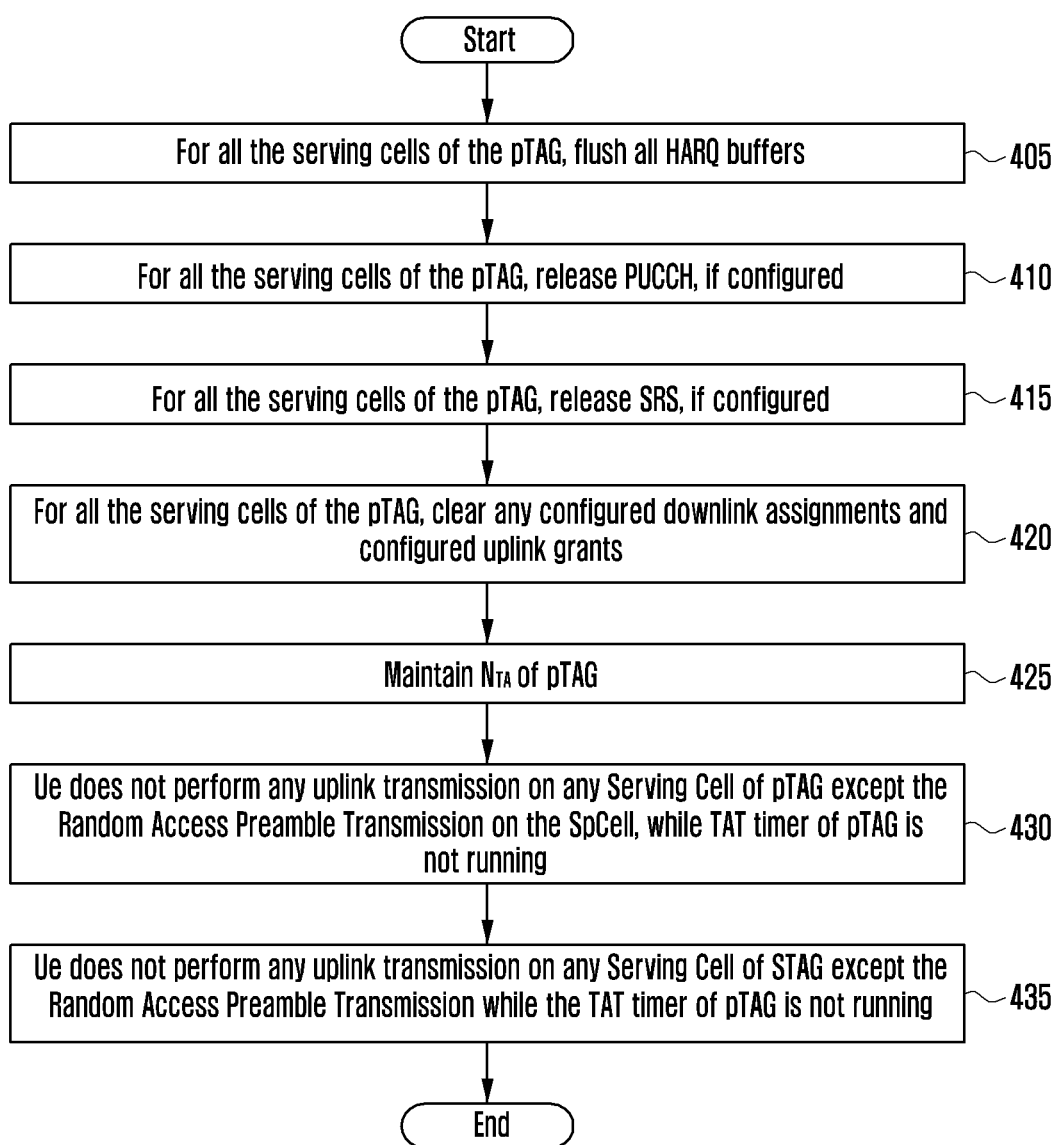
FIG. 4 is a flowchart illustrating a method of handling an expiry of a TAT for a pTAG according to an embodiment.

In this embodiment, upon expiry of timeAlignmentTimer associated with the pTAG, the UE performs the following operations (as illustrated in FIG. 4).

FIG. 4 is a flowchart illustrating a method of handling an expiry of a TAT for a pTAG according to an embodiment.

Referring to FIG. 4:

1. For all the serving cells of the pTAG, the UE will:
   a. flush all HARQ buffers (step 405);
   b. release the PUCCH, if configured (step 410);
   c. release the SRS, if configured (step 415); and
   d. clear any configured downlink assignments and configured uplink grants (420).
2. The UE maintains $N_{TA}$ of the pTAG (step 425).
3. The UE does not perform any uplink transmission on any serving cell of the pTAG, except the random access preamble transmission on the SpCell, until the pTAG is UL synchronized. The UE does not perform any uplink transmission on any serving cell of the pTAG, except the random access preamble transmission on the SpCell, while the TAT timer of pTAG is not running (step 430).
4. For each sTAG, the UE does not perform any uplink transmission on any serving cell of the sTAG, except the random access preamble transmission, until the pTAG is UL synchronized. For each sTAG, the UE does not perform any uplink transmission on any serving cell of the sTAG, except the random access preamble transmission, while the TAT of the pTAG is not running (step 435). The TAT timers for sTAGs are not considered expired upon expiry of the pTAG TAT.

For example, when UE is configured with two sTAGs (sTAG1 and sTAG2), wherein sTAG1 comprises cell 1, cell 2, and cell 3 and sTAG2 comprises cell 4, cell 5, and cell 6, the UE will stop UL transmission on cell 1, cell 2, cell 3, cell 4, cell 5, and cell 6, until the pTAG is UL synchronized. There is no need to perform UL synchronization of sTAG1 and sTAG2 after the pTAG is UL synchronized.

In this embodiment, the TAT timers for sTAG1 and sTAG2 are not considered expired upon expiry of the pTAG TAT timer.

Embodiment 1-5

A UE in an RRC CONNECTED state is configured with multiple serving cells by at least one base station. The UE is also configured with at least one pTAG and one sTAG. The UE is also configured with the value of timeAlignmentTimer (TAT) timers associated with the configured TAGs.

Upon receiving a TAC in a random access response message for a serving cell belonging to a TAG, if the random access preamble was not selected by a MAC entity in the UE, among the contention-based random access preambles or if the timeAlignmentTimer is not running for this TAG, the MAC entity in the UE starts the timeAlignmentTimer associated with this TAG.

If the MAC entity in the UE receives a TAC MAC CE, and if an $N_{TA}$ (as defined in 3GPP TS 38.211) has been maintained with the indicated TAG, the MAC entity in the UE starts or restarts the timeAlignmentTimer associated with the indicated TAG.

Figure 5:
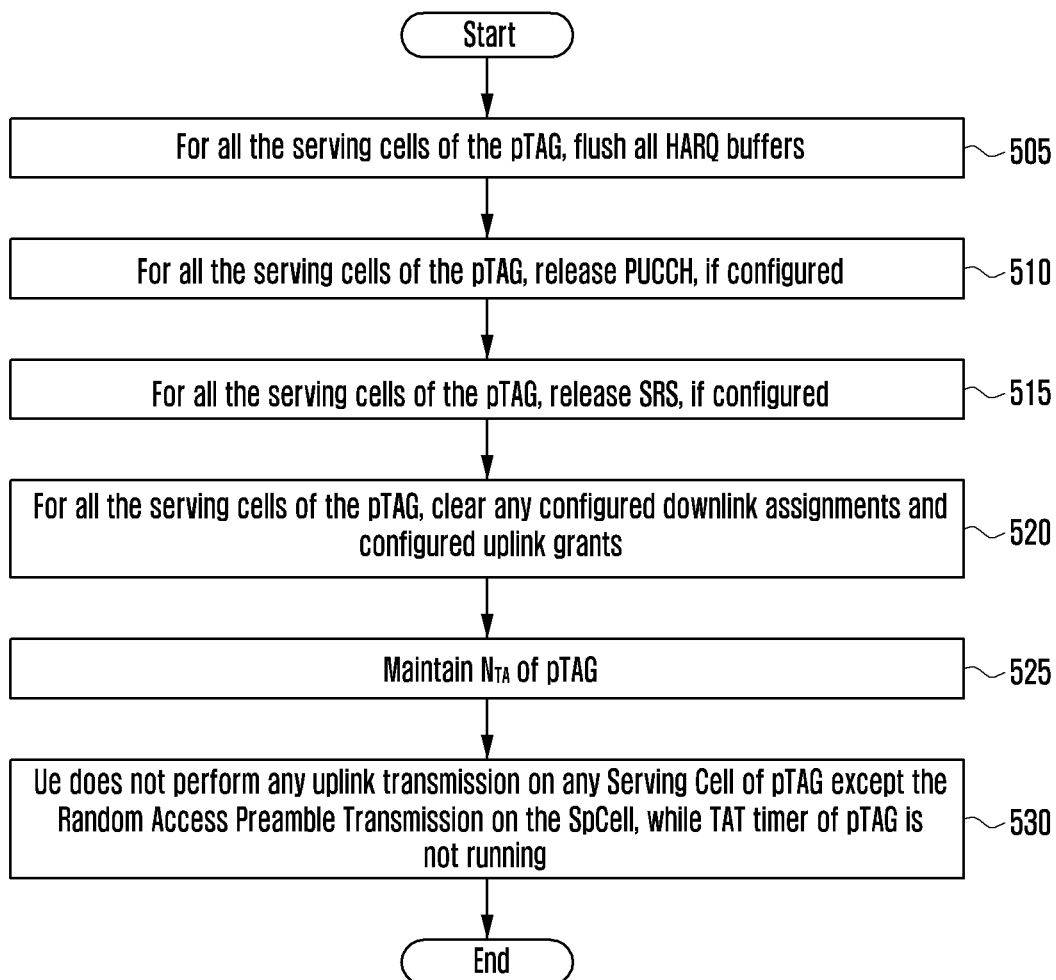
FIG. 5 is a flowchart illustrating a method of handling an expiry of a TAT for a pTAG according to an embodiment.

In this embodiment, upon expiry of timeAlignmentTimer associated with the pTAG, the UE performs the following operations (as illustrated in FIG. 5).

FIG. 5 is a flowchart illustrating a method of handling an expiry of a TAT for a pTAG according to an embodiment. Referring to FIG. 5:
1. For all the serving cells of the pTAG, the UE will:
   a. flush all HARQ buffers (step 505);
   b. release the PUCCH, if configured (step 510);
   c. release the SRS, if configured (step 515); and
   d. clear any configured downlink assignments and configured uplink grants (step 520).
2. The UE maintains $N_{TA}$ of the pTAG (step 525);
3. The UE does not perform any uplink transmission on any serving cell of the pTAG, except the random access preamble transmission on the SpCell, until the pTAG is UL synchronized. The UE does not perform any uplink transmission on any serving cell of the pTAG, except the random access preamble transmission on the SpCell, while the TAT timer of the pTAG is not running (step 530).
4. The TAT timers for the sTAGs are not considered expired upon expiry of the pTAG TAT timer.

Embodiment 1-6

According to a current procedure of a UE, if a TAT timer for an sTAG is expired, then for all Serving Cells belonging to this TAG, the UE will flush all HARQ buffers, notify the RRC to release the PUCCH, if configured, notify the RRC to release the SRS, if configured, clear any configured downlink assignments and configured uplink grants, and maintain $N_{TA}$ of this TAG.

However, when the TAT timer of an sTAG1 is expired, one of the serving cell in sTAG1 is a PUCCH SCell. The PUCCH feedback for a serving cell in sTAG2 is sent on the PUCCH SCell. In this case, UL transmission on sTAG2 (at least on serving cell whose feedback is sent on the PUCCH SCell in sTAG1) should be stopped.

Various options are provided below to solve the issue above.

Option 1: If a TAT timer for an sTAG1 is expired and sTAG1 includes a PUCCH SCell, and if there is any serving cell in an STAG2 whose PUCCH feedback is sent on a serving cell (i.e., a PUCCH SCell) in sTAG1, the TAT timer of the sTAG 2 is considered to be expired.

Option 2: If the TAT timer for the sTAG1 is expired and the sTAG1 includes a PUCCH SCell, and if there is any serving cell in the sTAG 2 whose PUCCH feedback is sent on a serving cell (i.e., a PUCCH SCell) in the sTAG1, the UE stops UL transmission in the sTAG 2 until the sTAG1 is UL synchronized.

If the TAT timer for the sTAG1 is expired and the sTAG1 includes the PUCCH SCell and if there is any serving cell in the sTAG2 whose PUCCH feedback is sent on a serving cell (i.e., a PUCCH SCell) in the sTAG1, the UE stops UL transmission in the sTAG2 while the TAT timer of the sTAG1 is not running.

Option 3: If the TAT timer for the sTAG1 is expired and the sTAG 1 includes a PUCCH SCell, for each serving cell whose PUCCH feedback is transmitted on this PUCCH SCell, the UE stops UL transmission until the sTAG1 is UL synchronized.

If the TAT timer for the sTAG1 is expired and the sTAG1 includes a PUCCH SCell, for each serving cell whose PUCCH feedback is sent on this PUCCH SCell, the UE stops UL transmission while the TAT timer of the sTAG1 is not running.

Embodiment 2-1

Figure 6:
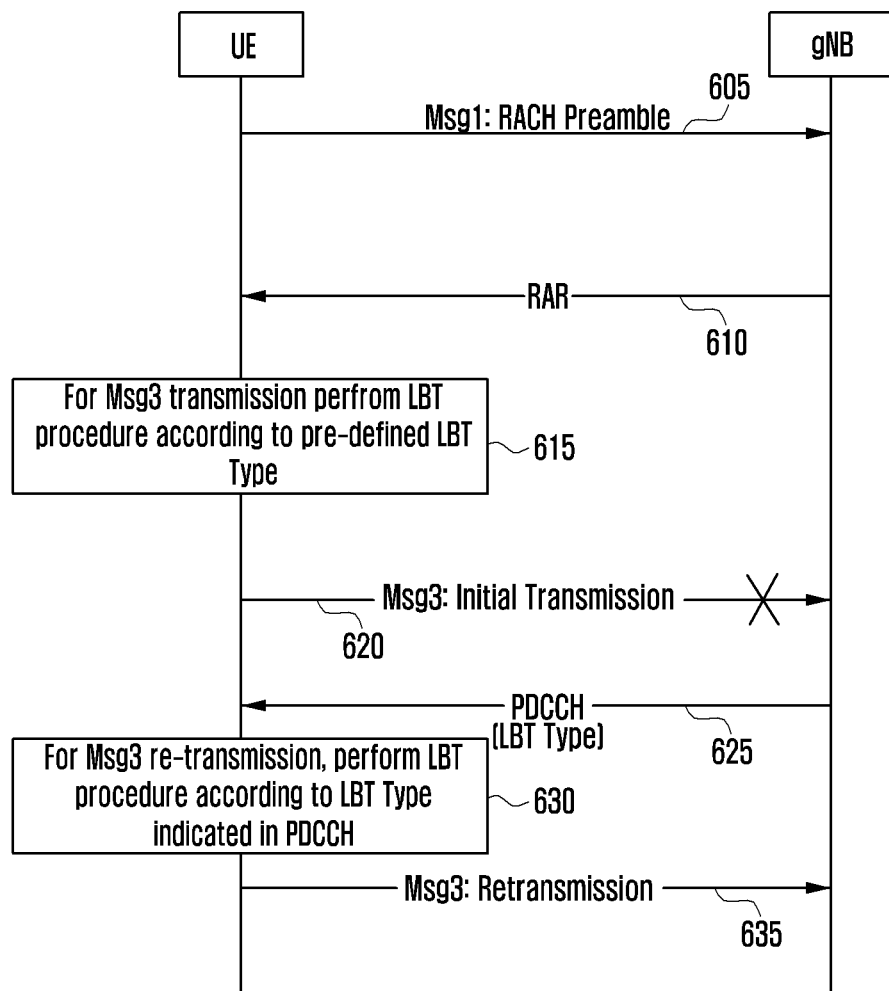
FIG. 6 is a signal flow diagram illustrating a method of determining an LBT type for a Msg3 transmission according to an embodiment.

FIG. 6 is a signal flow diagram illustrating a method of determining an LBT type for a Msg3 transmission according to an embodiment.

In the embodiment of FIG. 6, an LBT type (or channel access type) or an LBT category for an initial transmission (i.e., a first HARQ packet transmission of a HARQ process corresponding to a UL grant received in an RAR) of Msg3 is pre-defined and an LBT type (or a channel access type) or an LBT category for a Msg3 retransmission (i.e., a subsequent HARQ packet transmission of the HARQ process corresponding to the UL grant received in the RAR) is indicated in a PDCCH, which includes the scheduling information for the Msg3 retransmission. The PDCCH indicating retransmission of Msg3 is addressed to a temporary C-RNTI (TC-RNTI) wherein TC-RNTI is indicated to UE by gNB in RAR.

The LBT type pre-defined for the initial transmission of Msg3 may be LBT type 1 or LBT type 2. The LBT category pre-defined for the initial transmission of Msg3 may be LBT category 2 or LBT category 4. The LBT category pre-defined for the initial transmission of Msg3 may be LBT category 2 or LBT category 3. The LBT category pre-defined for the initial transmission of Msg3 may be LBT category 1, LBT category 2, or LBT category 4. The LBT category pre-defined for the initial transmission of Msg3 may be LBT category 1, LBT category 2, or LBT category 3. The LBT category pre-defined for the initial transmission of Msg3 may be LBT category 1, LBT category 2, LBT category 3, or LBT category 4.

The LBT type indicated in a PDCCH for a re-transmission of Msg3 may be LBT type 1 or LBT type 2. In this case, the LBT type field of 1 bit length can be added in the PDCCH, wherein two code points (i.e., 0 and 1) of the added field indicate one of LBT type 1 and LBT type 2, respectively.

The LBT category indicated in the PDCCH for the re-transmission of Msg3 may be LBT category 2 or LBT category 4. In this case, the LBT category field of 1 bit length can be added in the PDCCH, wherein two code points (i.e., 0 and 1) of the added field indicate one of LBT category 2 and LBT category 4, respectively.

The LBT category indicated in the PDCCH for the re-transmission of Msg3 may be LBT category 2 or LBT category 3. In this case, the LBT category field of 1 bit length can be added in the PDCCH, wherein two code points (i.e., 0 and 1) of the added field indicate one of LBT category 2 and LBT category 3, respectively.

The LBT category indicated in the PDCCH for the re-transmission of Msg3 may be LBT category 1, LBT category 2, or LBT category 4. In this case, the LBT category field of a 2 bit length can be added in the PDCCH, wherein three code points (e.g., 00, 01, and 10) of the added field indicate one of LBT category 1, LBT category 2, and LBT category 4, respectively. Alternatively, 1 bit can indicate whether LBT is needed or not. When LBT is not needed, the LBT category is 1. If LBT is needed, another bit can indicate LBT category 2 or LBT category 4. A $2^{nd}$ bit may be omitted from the PDCCH if $1^{st}$ bit indicates that LBT is not needed.

The LBT category indicated in the PDCCH for the re-transmission of Msg3 may be LBT category 1, LBT category 2, or LBT category 3. In this case, the LBT category field of a 2 bit length can be added in the PDCCH, wherein three code points (e.g., 00, 01, and 10) of the added field indicate one of LBT category 1, LBT category 2, and LBT category 3, respectively. Alternatively, 1 bit can indicate whether LBT is needed or not. When LBT is not needed, the LBT category is 1. If LBT is needed, another bit in the PDCCH may indicate LBT category 2 or LBT category 3. A $2^{nd}$ bit may be omitted from the PDCCH if $1^{st}$ bit indicates that the LBT is not needed.

The LBT category indicated in the PDCCH for the re-transmission of Msg3 may LBT category 1, LBT category 2, LBT category 3, or LBT category 4. In this case, the LBT category field of a 2 bit length can be added in the PDCCH, wherein four code points (e.g., 00, 01, 10, and 11) of the added field indicate one of LBT category 1, LBT category 2, LBT category 3, and LBT category 4, respectively.

Referring to FIG. 6, the UE transmits a random access channel (RACH) preamble (or a random access preamble) in step 605, and then monitors a PDCCH addressed to an RA-RNTI in an RAR window for receiving an RAR.

Upon receiving the RAR corresponding to RACH preamble (or the random access preamble) in step 610, the UE performs an LBT procedure according to a pre-defined LBT type or a pre-defined LBT category in step 615 and transmits an initial Msg3 transmission in step (620.

If the LBT type (or channel access type) pre-defined for the Msg3 transmission is 1 or LBT category pre-defined for the Msg3 transmission is 3 or 4, the channel access priority class to determine the channel access parameters (e.g., m, contention window (CW) size, etc.) for the LBT procedure are also pre-defined. An RAR corresponds to RACH preamble transmitted by UE if the transport block (TB) scheduled by PDCCH addressed to RA-RNTI includes RAR, wherein a random access preamble identifier (RAPID) in the received RAR is equal to RAPID of RACH preamble transmitted by UE.

After transmitting the initial transmission of Msg3 in UL grant received in RAR, UE monitors for the PDCCH addressed to TC-RNTI. The PDCCH addressed to TC-RNTI may indicate a UL grant for a retransmission of Msg3 or it may indicate a DL TB carrying Msg4.

If UE receives a PDCCH for retransmitting the Msg3 in step 625, the UE performs the LBT procedure as indicated in PDCCH in step 630 and retransmits Msg3 in step 635.

If the LBT type (or channel access type) indicated in the PDCCH is 1 or the LBT category indicated in the PDCCH is 3 or 4, the channel access priority class (CAPC) to determine the channel access parameters (e.g., m, CW size, etc.) for the LBT procedure may also be indicated in the PDCCH. Alternatively, the CAPC is not indicated in the PDCCH, but it is independently pre-defined and/or indicated in system information (SI) and/or an RRC message. The CAPC for Msg3 transmission can also be determined based on Msg3 content (e.g., a logical channel of a MAC SDU, a MAC CE, etc.).

Mapping between CAPCs and logical channels can be pre-defined and/or signaled in SI and/or an RRC message. Typically, Msg3 will carry a MAC SDU for signaling radio bearers (SRBs). For SRB 0, SRB 1, and SRB 3, the CAPC can be pre-defined, i.e., a highest priority CAPC (lowest CAPC index), whereas for SRB 2 it can be configured via an RRC message.

CAPC can be pre-defined or signaled for MAC CEs. For example, a CAPC for a MAC CE can be a highest priority CAPC (or lowest CAPC index). As another example, the CAPC for Msg3 transmission can be determined based on an event that triggered the random access procedure. For example, if a random access procedure is triggered because of a handover or for a beam failure recovery, a highest priority CAPC (or lowest CAPC index) can be used.

The LBT type or category in a PDCCH can be optional. If the LBT type or category is not received in a PDCCH that includes scheduling information for the Msg3 retransmission, the UE may perform the LBT procedure of pre-defined type (Type 1 or Type 2) or category and re-transmits Msg3.

In an embodiment, if the UL grant indicated in PDCCH for retransmission is located within the gNB initiated COT and gap between DL transmission in COT and UL transmission based on indicated UL grant is less than 16 us, gNB can indicate LBT Category 1 in PDCCH. If the UL grant indicated in PDCCH for retransmission is located within the gNB initiated COT and gap between DL transmission in COT and UL transmission based on indicated UL grant is greater than 16 us but less than 25 us, gNB can indicate Type 2 or LBT category 2 in PDCCH. If the UL grant indicated in PDCCH for retransmission is located within the gNB initiated COT and is not followed by any DL transmission in the same COT, gNB can indicate Type 2 or LBT category 2 in PDCCH. If the UL grant indicated in PDCCH for retransmission is located outside the gNB initiated COT, gNB can indicate LBT Type 1 or LBT category 3/4 in PDCCH.

Embodiment 2-2

Figure 7:
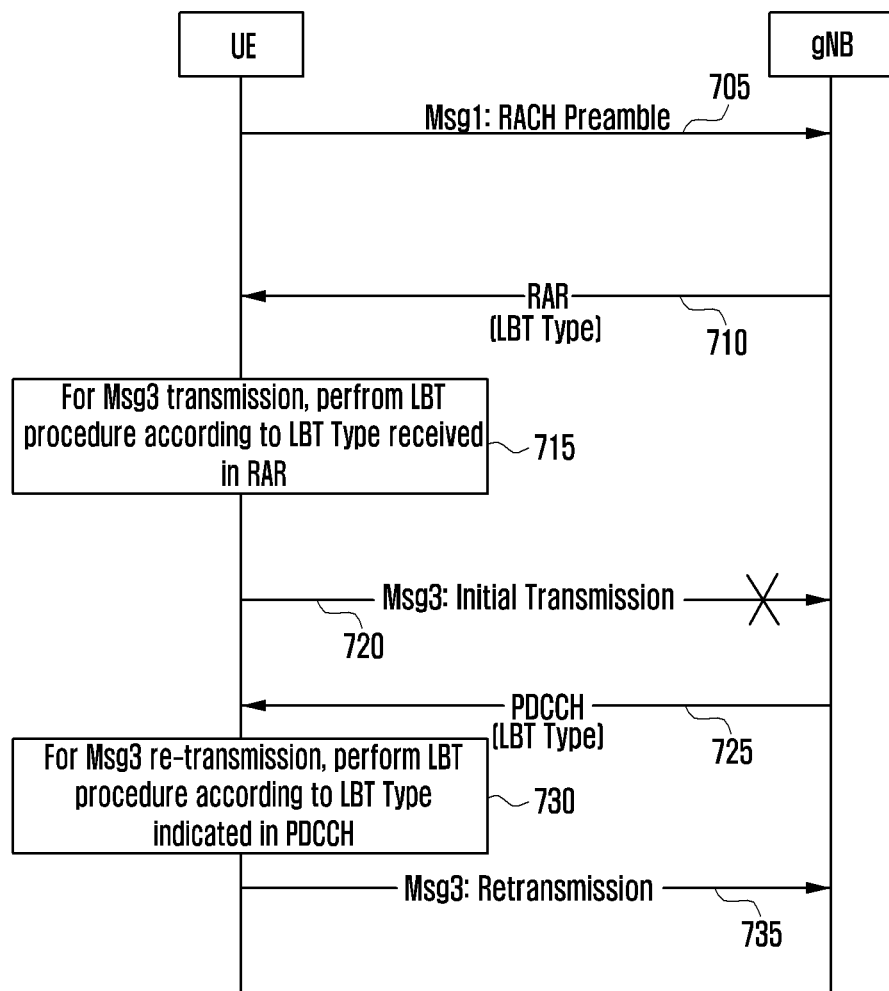
FIG. 7 is a signal flow diagram illustrating a method of determining an LBT type for a Msg3 transmission according to an embodiment.

FIG. 7 is a signal flow diagram illustrating a method of determining an LBT type for a Msg3 transmission according to an embodiment.

In the embodiment of FIG. 7, an LBT type (or a channel access type) or an LBT category for an initial transmission (i.e., a first HARQ packet transmission of a HARQ process corresponding to a UL grant received in an RAR) of Msg3 is indicated in an RAR and an LBT type (or a channel access type) or an LBT category for Msg3 retransmission (i.e., a subsequent HARQ packet transmission of the HARQ process corresponding to the UL grant received in the RAR) is indicated in PDCCH scheduling the retransmission. The PDCCH indicating the retransmission of Msg3 is addressed to a TC-RNTI, wherein the TC-RNTI is indicated to the UE by a gNB in an RAR.

The LBT type indicated in the RAR for the initial transmission of Msg3 may be LBT type 1 or LBT type 2. In this case, an LBT type field of a 1 bit length can be added in the RAR, wherein two code points (i.e., 0 and 1) of the added field indicate one of LBT type 1 and LBT type 2, respectively.

The LBT category indicated in the RAR for the initial transmission of Msg3 may also be LBT category 2 or LBT category 4. In this case, the LBT category field of a 1 bit length can be added in the RAR, wherein two code points (i.e., 0 and 1) of the added field indicate one of LBT category 2 and LBT category 4, respectively.

The LBT category indicated in the RAR for the initial transmission of Msg3 may also be LBT category 2 or LBT category 3. In this case, the LBT category field of a 1 bit length can be added in the RAR, wherein code points (i.e., 0 and 1) of the added field indicate one of LBT category 2 and LBT category 3, respectively.

The LBT category indicated in the RAR for the initial transmission of Msg3 may also be LBT category 1, LBT category 2, or LBT category 4. In this case, the LBT category field of a 2 bit length can be added in the RAR, wherein three code points (e.g., 00, 01, and 10) of the added field indicate one of LBT category 1, LBT category 2, and LBT category 4, respectively.

Alternatively, 1 bit can indicate whether LBT is needed or not. When LBT is not needed, the LBT category is 1. If the LBT is needed, another bit can indicate LBT category 2 or LBT category 4. A $2^{nd}$ bit may be omitted from the RAR if a $1^{st}$ bit indicates that LBT is not needed.

The LBT category indicated in the RAR for the initial transmission of Msg3 may also be LBT category 1, LBT category 2, or LBT category 3. In this case, the LBT category field of a 2 bit length can be added in the RAR, wherein three code points (e.g., 00, 01, and 10) of the added field indicate one of LBT category 1, LBT category 2, and LBT category 3, respectively.

Alternatively, 1 bit can indicate whether LBT is needed or not. When LBT is not needed, the LBT category is 1. If LBT is needed, another bit can indicate LBT category 2 or LBT category 3. A $2^{nd}$ bit may be omitted from the RAR if a $1^{st}$ bit indicates that LBT is not needed.

The LBT category indicated in the RAR for the initial transmission of Msg3 may also be LBT category 1, LBT category 2, LBT category 3, or LBT category 4. In this case, the LBT category field of a 2 bit length can be added in the RAR, wherein four code points (e.g., 00, 01, 10, and 11) of the added field indicate one of LBT category 1, LBT category 2, LBT category 3, and LBT category 4, respectively.

The LBT type indicated in a PDCCH for re-transmission of Msg3 may be LBT type 1 or LBT type 2. In this case, an LBT type field of a 1 bit length can be added in the PDCCH, wherein two code points (i.e., 0 and 1) of the added field indicate one of LBT type 1 and LBT type 2, respectively.

The LBT category indicated in the PDCCH for re-transmission of Msg3 may also be LBT category 2 or LBT category 4. In this case, the LBT category field of a 1 bit length can be added in the PDCCH, wherein two code points (i.e., 0 and 1) of the added field indicate one of LBT category 2 and LBT category 4, respectively.

The LBT category indicated in the PDCCH for re-transmission of Msg3 may also be LBT category 2 or LBT category 3. In this case, the LBT category field of a 1 bit length can be added in the PDCCH, wherein two code points (i.e., 0 and 1) of the added field indicate one of LBT category 2 and LBT category 3, respectively.

The LBT category indicated in the PDCCH for re-transmission of Msg3 may also be LBT category 1, LBT category 2, or LBT category 4. In this case, the LBT category field of a 2 bit length can be added in the PDCCH, wherein three code points (e.g., 00, 01, and 10) of the added field indicate one of LBT category 1, LBT category 2, and LBT category 4, respectively.

Alternatively, 1 bit can indicate whether LBT is needed or not. When the LBT is not needed, the LBT category is 1. If LBT is needed, another bit can indicate LBT category 2 or LBT category 4. A $2^{nd}$ bit may be omitted from the PDCCH if the $1^{st}$ bit indicates that LBT is not needed.

The LBT category indicated in the PDCCH for re-transmission of Msg3 may also be LBT category 1, LBT category 2, or LBT category 3. In this case, the LBT category field of a 2 bit length can be added in the PDCCH, wherein three code points (e.g., 00, 01, and 10) of the added field indicate one of LBT category 1, LBT category 2, and LBT category 3, respectively.

Alternatively, 1 bit can indicate whether LBT is needed or not. When the LBT is not needed, the LBT category is 1. If LBT is needed, another bit in the PDCCH indicates LBT category 2 or LBT category 3. A $2^{nd}$ bit may be omitted from the PDCCH if the $1^{st}$ bit indicates that LBT is not needed.

The LBT category indicated in the PDCCH for re-transmission of Msg3 may also be LBT category 1, LBT category 2, LBT category 3, or LBT category 4. In this case, the LBT category field of a 2 bit length can be added in the PDCCH, wherein four code points (e.g., 00, 01, 10, and 11) of the added field indicate one of LBT category 1, LBT category 2, LBT category 3, and LBT category 4, respectively.

Referring to FIG. 7, in step 605, the UE transmits the RACH preamble (or a random access preamble), and then monitors a PDCCH addressed to an RA-RNTI in an RAR window for receiving an RAR.

Upon receiving the RAR corresponding to RACH preamble in step 710, the UE performs an LBT procedure according to an LBT type or category as indicated in an RAR in step 715 and transmits an initial Msg3 transmission in step 720. An RAR corresponds to a RACH preamble transmitted by the UE if the TB scheduled by a PDCCH addressed to the RA-RNTI includes the RAR, wherein RAPID in the received RAR is equal to RAPID of the RACH preamble transmitted by UE. If the LBT type (or channel access type) indicated in the RAR is 1 or the LBT category indicated in the RAR is 3 or 4, the CAPC to determine the channel access parameters (e.g., m, CW size, etc.) for the LBT procedure may be indicated in the RAR.

Alternatively, the CAPC is not indicated in the RAR, but it is pre-defined and/or indicated in SI and/or an RRC message. The CAPC can also be determined based on Msg3 content (e.g., a logical channel of a MAC SDU, a MAC CE, etc.).

Mapping between CAPCs and logical channels can be pre-defined or signaled in SI and/or an RRC message. Typically, Msg3 will carry a MAC SDU for SRBs. For SRB 0, SRB 1, and SRB 3, the CAPC can be pre-defined, i.e., a highest priority CAPC (or lowest CAPC index), whereas for SRB 2, the CAPC can be configured via an RRC message.

CAPC can be pre-defined or signaled for MAC CEs. For example, the CAPC for a MAC CE can be a highest priority CAPC (or a lowest CAPC index). As another example, the CAPC for Msg3 transmission can be determined based on an event that triggered the random access procedure. For example, if a random access procedure is triggered because of a handover or for a beam failure recovery, a highest priority CAPC (or a lowest CAPC index) can be used.

After transmitting the initial transmission of Msg3 in the UL grant received in the RAR, the UE monitors for a PDCCH addressed to a TC-RNTI. The PDCCH addressed to the TC-RNTI may indicate a UL grant for retransmission of Msg3 or may indicate a DL TB carrying Msg4.

If the UE receives the PDCCH for retransmitting the Msg3 in step 725, the UE performs the LBT procedure as indicated in the PDCCH in step 730 and retransmits Msg3 in step 735.

If the LBT type (or channel access type) indicated in the PDCCH is 1 or the LBT category indicated in the PDCCH is 3 or 4, the CAPC to determine the channel access parameters (e.g., m, CW size, etc.) for the LBT procedure may be also indicated in the PDCCH.

Alternatively, the CAPC is not indicated in the PDCCH, but is pre-defined and/or indicated in SI and/or an RRC message. As another example, the CAPC can be determined based on Msg3 content (e.g., a logical channel of a MAC SDUs, a MAC CE, etc.).

Mapping between CAPCS and logical channels can be pre-defined and/or signaled in SI and/or an RRC message. Typically, Msg3 will carry a MAC SDU for SRBs. For SRB 0, SRB 1, and SRB 3, the CAPC can be pre-defined, i.e., a highest priority CAPC (or a lowest CAPC index), whereas for SRB 2, the CAPC can be configured via an RRC message.

CAPC can be pre-defined or signaled for the MAC CEs. The CAPC for the MAC CE can be a highest priority CAPC (or a lowest CAPC index). The CAPC for Msg3 transmission can be determined based on an event that triggered the random access procedure, as described above. For example, if a random access procedure is triggered because of a handover or for beam failure recovery, a highest priority CAPC (or a lowest CAPC index) can be used.

The LBT type or category in the PDCCH can be optional. If the LBT type or category is not received in a PDCCH that includes the scheduling information for the Msg3 retransmission, the UE may perform the same LBT procedure as used for an initial Msg3 transmission and re-transmit Msg3.

The LBT type or category in the RAR can be optional. If LBT type or category is not received in the RAR, the UE may perform the LBT procedure using the LBT type or category pre-defined or signaled in SI or an RRC message.

The LBT type or category for the initial transmission of Msg3 can be indicated in a PDCCH for an RAR, instead of the RAR. The remaining procedure is as explained above.

In an embodiment, if the UL grant indicated in PDCCH for Msg3 retransmission is located within the gNB initiated COT and gap between DL transmission in COT and UL transmission based on indicated UL grant is less than 16 us, gNB can indicate LBT Category 1 in PDCCH. If the UL grant indicated in PDCCH for Msg3 retransmission is located within the gNB initiated COT and gap between DL transmission in COT and UL transmission based on indicated UL grant is greater than 16 us but less than 25 us, gNB can indicate Type 2 or LBT category 2 in PDCCH. If the UL grant indicated in PDCCH for Msg3 retransmission is located within the gNB initiated COT and is not followed by any DL transmission in the same COT, gNB can indicate Type 2 or LBT category 2 in PDCCH. If the UL grant indicated in PDCCH for msg3 retransmission is located outside the gNB initiated COT, gNB can indicate LBT Type 1 or LBT category 3/4 in PDCCH.

In an embodiment, if the UL grant indicated in RAR for initial transmission of Msg3 is located within the gNB initiated COT and gap between DL transmission in COT and UL transmission based on indicated UL grant is less than 16 us, gNB can indicate LBT Category 1 in PDCCH. If the UL grant indicated in RAR for initial transmission of Msg3 is located within the gNB initiated COT and gap between DL transmission in COT and UL transmission based on indicated UL grant is greater than 16 us but less than 25 us, gNB can indicate Type 2 or LBT category 2 in PDCCH. If the UL grant indicated in RAR for initial transmission of Msg3 is located within the gNB initiated COT and is not followed by any DL transmission in the same COT, gNB can indicate Type 2 or LBT category 2 in PDCCH. If the UL grant indicated in RAR for initial transmission of Msg3 is located outside the gNB initiated COT, gNB can indicate LBT Type 1 or LBT category 3/4 in PDCCH.

Embodiment 2-3

Figure 8:
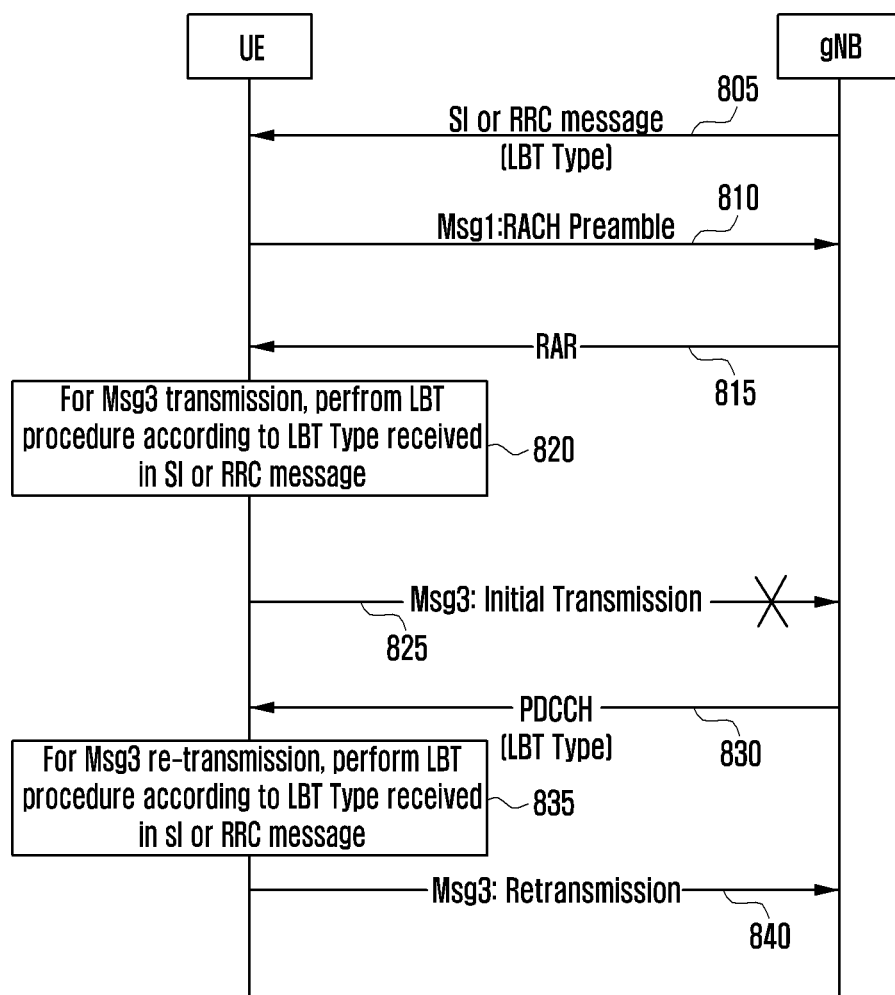
FIG. 8 is a signal flow diagram illustrating a method of determining an LBT type for a Msg3 transmission according to an embodiment.

FIG. 8 is a signal flow diagram illustrating a method of determining an LBT type for a Msg3 transmission according to an embodiment.

In the embodiment of FIG. 8, an LBT type (or a channel access type) or an LBT category for an initial transmission (i.e., a first HARQ packet transmission of a HARQ process corresponding to a UL grant received in an RAR) of Msg3 is indicated in SI (e.g., in a RACH configuration) and an LBT type (or a channel access type) or an LBT category for Msg3 retransmission (i.e., a subsequent HARQ packet transmission of the HARQ process corresponding to the UL grant received in the RAR) is indicated in a PDCCH scheduling the retransmission. The PDCCH indicating the retransmission of Msg3 is addressed to a TC-RNTI, wherein the TC-RNTI is indicated to the UE by a gNB in the RAR.

In an embodiment, LBT type indicated in SI/RRC message for initial transmission of Msg3 is one of LBT type 1 and LBT type 2. In this case LBT type field of 1 bit length can be added in SI/RRC message wherein each of two code points (i.e., 0 and 1) of added field indicates one of LBT type 1 and LBT type 2. In another embodiment LBT category indicated in SI/RRC message for initial transmission of Msg3 is one of LBT category 2 and LBT category 4. In this case LBT category field of 1 bit length can be added in SI/RRC message wherein each of two code points (i.e. 0 and 1) of added field indicates one of LBT category 2 and LBT category 4. In another embodiment LBT category indicated in SI/RRC message for initial transmission of Msg3 is one of LBT category 2 and LBT category 3. In this case LBT category field of 1 bit length can be added in SI/RRC message wherein each of two code points (i.e. 0 and 1) of added field indicates one of LBT category 2 and LBT category 3. In another embodiment LBT category indicated in SI/RRC message for initial transmission of Msg3 is one of LBT category 1, LBT category 2 and LBT category 4. In this case LBT category field of 2 bit length can be added in SI/RRC message wherein each of three code points (e.g. 00, 01 and 10) of added field indicates one of LBT category 1, LBT category 2 and LBT category 4. Alternately 1 bit can indicate whether LBT is needed or not. Note that LBT is not needed means LBT category is 1. If LBT is needed, another bit can indicate LBT category 2 or LBT category 4. $2^{nd}$ bit may not be included in SI/RRC message if $1^{st}$ bit indicates that LBT is not needed. In another embodiment LBT category indicated in SI/RRC message for initial transmission of Msg3 is one of LBT category 1, LBT category 2 and LBT category 3. In this case LBT category field of 2 bit length can be added in SI/RRC message wherein each of three code points (e.g. 00, 01 and 10) of added field indicates one of LBT category 1, LBT category 2 and LBT category 4. Alternately 1 bit can indicate whether LBT is needed or not. Note that LBT is not needed means LBT category is 1. If LBT is needed, another bit can indicate LBT category 2 or LBT category 4. $2^{nd}$ bit may not be included in SI/RRC message if $1^{st}$ bit indicates that LBT is not needed. In another embodiment LBT category indicated in SI/RRC message for initial transmission of Msg3 is one of LBT category 1, LBT category 2, LBT category 3 and LBT category 4. In this case LBT category field of 2 bit length can be added in PDCCH wherein each of three code points (e.g. 00, 01, 10 and 11) of added field indicates one of LBT category 1, LBT category 2, LBT category 3 and LBT category 4.

In an embodiment LBT type indicated in PDCCH for re-transmission of Msg3 is one of LBT type 1 and LBT type 2. In this case LBT type field of 1 bit length can be added in PDCCH wherein each of two code points (i.e. 0 and 1) of added field indicates one of LBT type 1 and LBT type 2. In an embodiment LBT category indicated in PDCCH for re-transmission of Msg3 is one of LBT category 2 and LBT category 4. In this case LBT category field of 1 bit length can be added in PDCCH wherein each of two code points (i.e. 0 and 1) of added field indicates one of LBT category 2 and LBT category 4. In another embodiment LBT category indicated in PDCCH for re-transmission of Msg3 is one of LBT category 2 and LBT category 3. In this case LBT category field of 1 bit length can be added in PDCCH wherein each of two code points (i.e. 0 and 1) of added field indicates one of LBT category 2 and LBT category 3. In another embodiment LBT category indicated in PDCCH for re-transmission of Msg3 is one of LBT category 1, LBT category 2 and LBT category 4. In this case LBT category field of 2 bit length can be added in PDCCH wherein each of three code points (e.g. 00, 01 and 10) of added field indicates one of LBT category 1, LBT category 2 and LBT category 4. Alternately 1 bit can indicate whether LBT is needed or not. Note that LBT is not needed means LBT category is 1. If LBT is needed, another bit can indicate LBT category 2 or LBT category 4. $2^{nd}$ bit may not be included in PDCCH if $1^{st}$ bit indicates that LBT is not needed. In another embodiment LBT category indicated in PDCCH for re-transmission of Msg3 is one of LBT category 1, LBT category 2 and LBT category 3. In this case LBT category field of 2 bit length can be added in PDCCH wherein each of three code points (e.g. 00, 01 and 10) of added field indicates one of LBT category 1, LBT category 2 and LBT category 3. Alternately 1 bit can indicate whether LBT is needed or not. Note that LBT is not needed means LBT category is 1. If LBT is needed another bit in PDCCH indicate LBT category 2 or LBT category 3. $2^{nd}$ bit may not be included in PDCCH if $1^{st}$ bit indicates that LBT is not needed. In another embodiment LBT category indicated in PDCCH for re-transmission of Msg3 is one of LBT category 1, LBT category 2, LBT category 3 and LBT category 4. In this case LBT category field of 2 bit length can be added in PDCCH wherein each of three code points (e.g. 00, 01, 10 and 11) of added field indicates one of LBT category 1, LBT category 2, LBT category 3 and LBT category 4.

Referring to FIG. 8, the UE receives SI or an RRC message in step 805.

In step 810, the UE transmits a RACH preamble (or a random access preamble) and then monitors a PDCCH addressed to an RA-RNTI in an RAR window for receiving an RAR.

Upon receiving the RAR corresponding to the RACH preamble in step 815, the UE perform the LBT procedure according to the LBT Type or category indicated in the received SI (e.g., in a RACH configuration) or the RRC message in step 820 and transmits an initial Msg3 transmission in step 825.

The RAR corresponds to the RACH preamble transmitted by the UE if the TB scheduled by the PDCCH addressed to the RA-RNTI includes the RAR, wherein RAPID in the received RAR is equal to RAPID of the RACH preamble transmitted by the UE.

If the LBT type (or channel access type) indicated in the SI or RRC message is 1 or if the indicated LBT category is 3 or 4, the CPAC to determine the channel access parameters (e.g., m, CW size, etc.) for the LBT procedure are pre-defined and/or indicated in the SI and/or the RRC message.

Alternatively, the CAPC can be determined based on Msg3 content (e.g., a logical channel of a MAC SDUs, a MAC CE, etc.).

Mapping between CAPCs and logical channels can be pre-defined or signaled in the SI or the RRC message. Typically, Msg3 will carry a MAC SDU for SRBs. For SRB 0, SRB 1, and SRB 3, CAPC can be pre-defined, i.e., a highest priority CAPC (or a lowest CAPC index), whereas for SRB 2, the CAPC can be configured via the RRC message.

CAPC can be pre-defined or signaled for MAC CEs. For example, the CAPC for a MAC CE can be a highest priority CAPC (or a lowest CAPC index). As another example, the CAPC for Msg3 transmission can be determined based on an event that triggered the random access procedure, as described above.

After transmitting the initial transmission of Msg3 in UL grant received in the RAR in step 825, the UE monitors for a PDCCH addressed to a TC-RNTI. The PDCCH addressed to the TC-RNTI may indicate a UL grant for retransmission of Msg3 or it may indicate DL TB carrying Msg4.

If UE receives the PDCCH for retransmitting the Msg3 in step 830, the UE performs the LBT procedure as indicated in PDCCH in step 835 and retransmits Msg3 in step 840.

The LBT procedure indicated in the SI or RRC message in step 805 may be applied for both Msg1 and Msg3 in steps 810 and 820.

If the LBT type (or channel access type) indicated in PDCCH is 1 or indicated category is 3 or 4, the channel access priority class to determine the channel access parameters (e.g. m, contention window (CW) size, etc.) for LBT procedure is also indicated in PDCCH. In another embodiment, channel access priority class is not indicated in PDCCH but it is pre-defined or indicated in SI or RRC message. In another embodiment it can be determined based on Msg3 content (e.g. logical channel MAC SDU, MAC CE, etc.). Mapping between Channel access priority classes and logical channels can be pre-defined or signaled in SI or RRC message. Note that typically Msg3 will carry MAC SDU for SRBs. For SRB 0, SRB 1 and SRB 3 CAPC can be pre-defined i.e. highest priority CAPC (lowest CAPC index) whereas for SRB 2 it can be configured via RRC message. Channel access priority class can be pre-defined or signaled for MAC CEs In an embodiment, CAPC for MAC CE can be highest priority CAPC (lowest CAPC index). In another embodiment channel access priority class for Msg3 transmission can be determined based on event which triggered the random access procedure. For example if random access procedure is triggered because of handover or for beam failure recovery highest priority CAPC (lowest CAPC index) can be used.

In the Embodiment 2-3, the LBT type or category in PDCCH can be optional. If LBT type or category is not received in the PDCCH that includes the scheduling information for the Msg3 retransmission, the UE may perform the same LBT procedure as used for initial Msg3 transmission and re-transmits Msg3. The LBT type or category in the SI or the RRC message can also be optional. If the LBT type or category is not received in SI or RRC message, the UE may perform the LBT procedure using a pre-defined LBT type or category.

Embodiment 2-4

Figure 9:
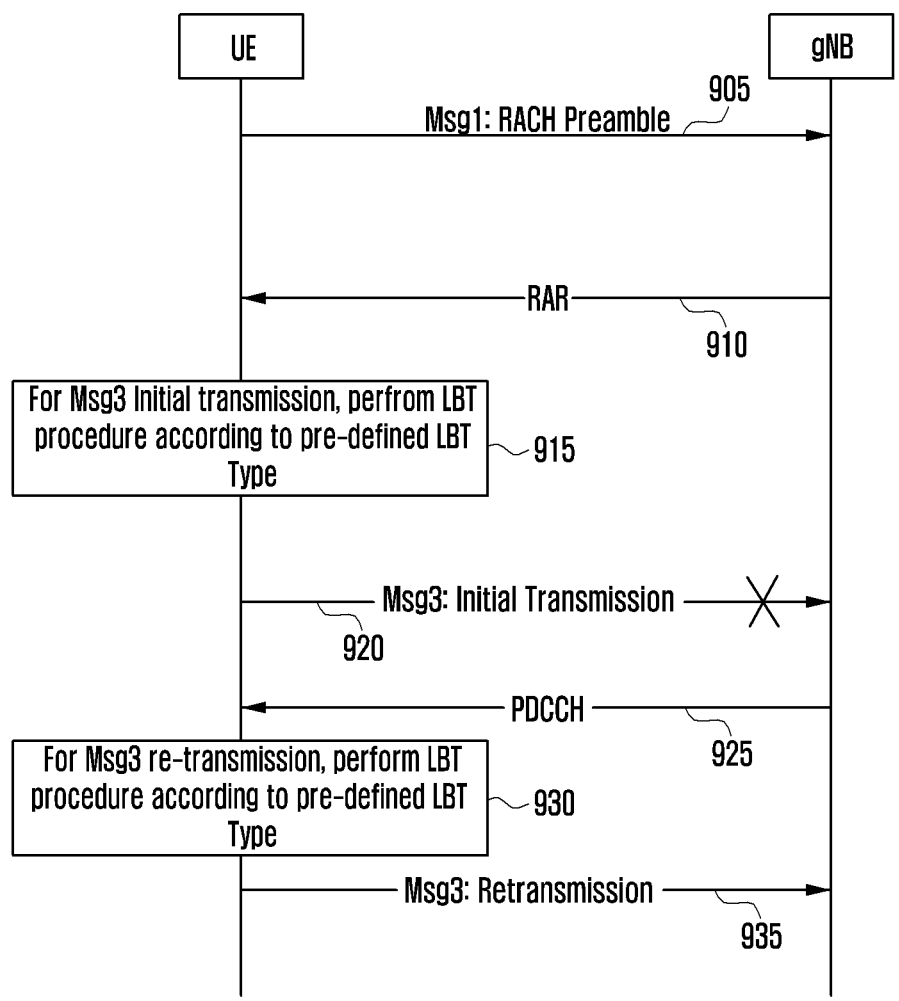
FIG. 9 is a signal flow diagram illustrating a method of determining an LBT type for a Msg3 transmission according to an embodiment.

FIG. 9 is a signal flow diagram illustrating a method of determining an LBT type for a Msg3 transmission according to an embodiment.

In the embodiment of FIG. 9, an LBT type (or a channel access type) or an LBT category for an initial transmission (i.e., a first HARQ packet transmission of a HARQ process corresponding to a UL grant received in an RAR) and an LBT type (or a channel access type) or an LBT category for Msg3 retransmission (i.e., a subsequent HARQ packet transmission of the HARQ process corresponding to the UL grant received in the RAR) is same and is predefined.

The LBT type pre-defined for the initial transmission and the retransmission of Msg3 may be LBT type 1 or LBT type 2.

The LBT category pre-defined for the initial transmission and the retransmission of Msg3 may be LBT category 2 or LBT category 4.

The LBT category pre-defined for the initial transmission and the retransmission of Msg3 may be LBT category 2 or LBT category 3.

The LBT category pre-defined for the initial transmission and the retransmission of Msg3 may be LBT category 1, LBT category 2, or LBT category 4.

The LBT category pre-defined for the initial transmission and the retransmission of Msg3 may be LBT category 1, LBT category 2, or LBT category 3.

The LBT category pre-defined for the initial transmission and the retransmission of Msg3 may be LBT category 1, LBT category 2, LBT category 3, or LBT category 4.

Referring to FIG. 9 the UE transmits a RACH preamble (or a random access preamble) in step 905, and then the UE monitors a PDCCH addressed to an RA-RNTI in an RAR window for receiving an RAR.

Upon receiving the RAR corresponding to the RACH preamble in step 910, the UE perform the LBT procedure according to the pre-defined type or category in step 915 and transmits initial Msg3 transmission in step 920.

The RAR corresponds to the RACH preamble transmitted by the UE if the TB scheduled by the PDCCH addressed to an RA-RNTI includes the RAR, wherein RAPID in the received RAR is equal to RAPID of RACH preamble transmitted by UE.

After transmitting the initial transmission of Msg3 in a UL grant received in the RAR in step 920, the UE monitors a PDCCH addressed to a TC-RNTI. The PDCCH addressed to the TC-RNTI may indicate a UL grant for retransmission of Msg3 or may indicate a DL TB carrying Msg4.

If the UE receives the PDCCH for retransmitting the Msg3 in step 925, the UE performs the LBT procedure according to the pre-defined type or category in step 930 and retransmits Msg3 in step 935.

If the pre-defined LBT type (or channel access type) is 1 (or the pre-defined category is 3 or 4, the CAPC to determine the channel access parameters (e.g., m, CW size, etc.) for the LBT procedure may also be pre-defined. Alternately, CAPC can be indicated in SI or RRC message or determined based on Msg3 content (e.g., a logical channel of a MAC SDU, a MAC CE, etc.).

Mapping between CAPCs and logical channels can be pre-defined or signaled in SI or an RRC message. Typically, Msg3 will carry a MAC SDU for SRBs. For SRB 0, SRB 1, and SRB 3, the CAPC can be pre-defined, i.e., a highest priority CAPC (or a lowest CAPC index), whereas for SRB 2, the CAPC can be configured via an RRC message.

CAPC can be pre-defined or signaled for MAC CEs. For example, the CAPC for a MAC CE can be a highest priority CAPC (or a lowest CAPC index). As another example, the CAPC for Msg3 transmission can be determined based on an event that triggered the random access procedure, as described above.

For example, if a random access procedure is triggered because of a handover or for beam failure recovery, a highest priority CAPC (or a lowest CAPC index) can be used.

Embodiment 2-5

Figure 10:
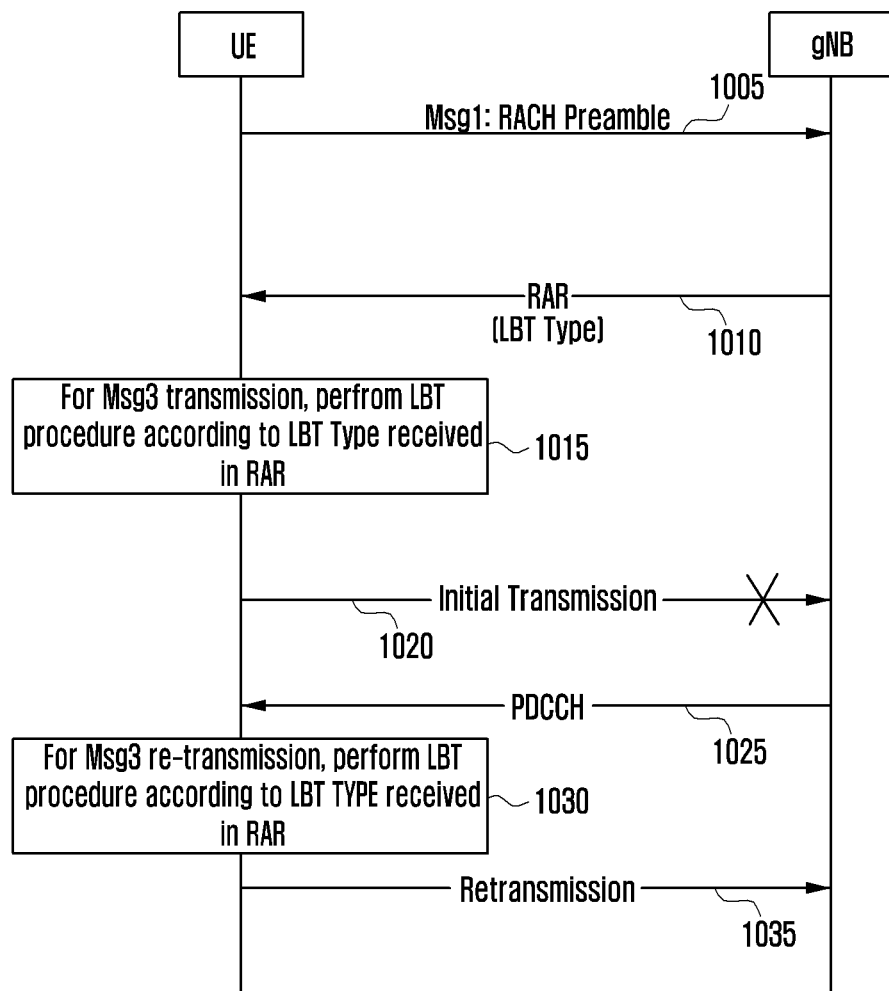
FIG. 10 is a signal flow diagram illustrating a method determining an LBT type for a Msg3 transmission according to an embodiment.

FIG. 10 is a signal flow diagram illustrating a method determining an LBT type for a Msg3 transmission according to an embodiment.

In the embodiment of FIG. 10, an LBT type (or a channel access type) or an LBT category for an initial transmission (i.e., a first HARQ packet transmission of a HARQ process corresponding to a UL grant received in an RAR) and an LBT type (or a channel access type) or an LBT category for Msg3 retransmission (i.e., a subsequent HARQ packet transmission of the HARQ process corresponding to the UL grant received in the RAR) is same and is indicated in RAR.

In an embodiment, LBT type indicated in RAR for transmission of Msg3 is one of LBT type 1 and LBT type 2. In this case LBT type field of 1 bit length can be added in RAR wherein each of two code points (i.e. 0 and 1) of added field indicates one of LBT type 1 and LBT type 2. In another embodiment LBT category indicated in RAR for transmission of Msg3 is one of LBT category 2 and LBT category 4. In this case LBT category field of 1 bit length can be added in RAR wherein each of two code points (i.e. 0 and 1) of added field indicates one of LBT category 2 and LBT category 4. In another embodiment LBT category indicated in RAR for transmission of Msg3 is one of LBT category 2 and LBT category 3. In this case LBT category field of 1 bit length can be added in RAR wherein each of two code points (i.e. 0 and 1) of added field indicates one of LBT category 2 and LBT category 3. In another embodiment LBT category indicated in RAR for transmission of Msg3 is one of LBT category 1, LBT category 2 and LBT category 4. In this case LBT category field of 2 bit length can be added in RAR wherein each of three code points (e.g. 00, 01 and 10) of added field indicates one of LBT category 1, LBT category 2 and LBT category 4. Alternately 1 bit can indicate whether LBT is needed or not. Note that LBT is not needed means LBT category is 1. If LBT is needed, another bit can indicate LBT category 2 or LBT category 4. $2^{nd}$ bit may not be included in RAR if $1^{st}$ bit indicates that LBT is not needed. In another embodiment LBT category indicated in RAR for transmission of Msg3 is one of LBT category 1, LBT category 2 and LBT category 3. In this case LBT category field of 2 bit length can be added in RAR wherein each of three code points (e.g. 00, 01 and 10) of added field indicates one of LBT category 1, LBT category 2 and LBT category 3. Alternately 1 bit can indicate whether LBT is needed or not. Note that LBT is not needed means LBT category is 1. If LBT is needed another bit in RAR indicate LBT category 2 or LBT category 3. $2^{nd}$ bit may not be included in RAR if $1^{st}$ bit indicates that LBT is not needed. In another embodiment LBT category indicated in RAR for transmission of Msg3 is one of LBT category 1, LBT category 2, LBT category 3 and LBT category 4. In this case LBT category field of 2 bit length can be added in RAR wherein each of three code points (e.g. 00, 01, 10 and 11) of added field indicates one of LBT category 1, LBT category 2, LBT category 3 and LBT category 4.

Referring to FIG. 10, in step 1005, the UE transmits a RACH preamble (or a random access preamble) and then monitors a PDCCH addressed to an RA-RNTI in an RAR window for receiving an RAR.

Upon receiving the RAR corresponding to the RACH preamble in step 1010, the UE performs the LBT procedure as indicated in the RAR in step 1015 and transmits an initial Msg3 transmission in step 1020.

The RAR corresponds to the RACH preamble transmitted by the UE, if the TB scheduled by the PDCCH addressed to an RA-RNTI includes the RAR, wherein RAPID in the received RAR is equal to RAPID of RACH preamble transmitted by the UE.

After transmitting the initial transmission of Msg3 in a UL grant received in the RAR in step 1020, the UE monitors a PDCCH addressed to a TC-RNTI. The PDCCH addressed to the TC-RNTI may indicate a UL grant for retransmission of Msg3 or may indicate a DL TB carrying Msg4.

If the UE receives the PDCCH for retransmitting the Msg3 in step 1025, the UE performs the LBT procedure as indicated in the RAR in step 1030 and retransmits Msg3 in step 1035.

If the LBT type (or the channel access type) indicated in the RAR is 1 or the LBT category indicated in the RAR is 3 or 4, the CAPC to determine the channel access parameters (e.g., m, CW size, etc.) for the LBT procedure may also be indicated in the RAR.

Alternatively, the CAPC is not indicated in RAR, but is pre-defined, indicated in SI or an RRC message, or determined based on Msg3 content (e.g., a logical channel of a MAC SDU, a MAC CE, etc.).

Mapping between the CAPCs and logical channels can be pre-defined or signaled in SI or an RRC message. Typically, Msg3 will carry a MAC SDU for SRBs. For SRB 0, SRB 1, and SRB 3, a CAPC can be pre-defined, i.e., a highest priority CAPC (or a lowest CAPC index), whereas for SRB 2, the CAPC can be configured via an RRC message.

CAPC can be pre-defined or signaled for MAC CEs. For example, the CAPC for a MAC CE can be a highest priority CAPC (or a lowest CAPC index). As another example, the CAPC for Msg3 transmission can be determined based on an event that triggered the random access procedure, as described above. For example, if a random access procedure is triggered because of a handover or for beam failure recovery, a highest priority CAPC (or a lowest CAPC index) can be used.

The LBT type or LBT category in the RAR can also be optional. For example, if the LBT type or the LBT category is not received in the RAR, the UE may perform the LBT procedure using an LBT type or an LBT category pre-defined or signaled in SI or an RRC message.

Embodiment 2-6

Figure 11:
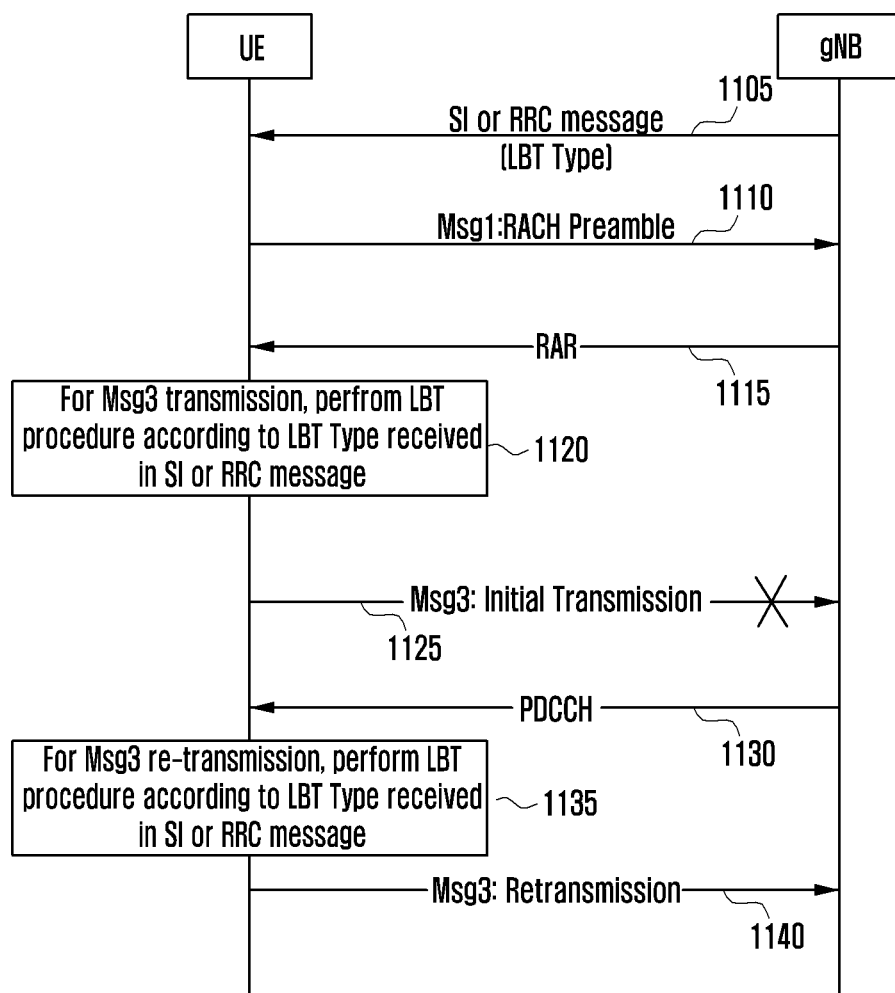
FIG. 11 is a signal flow diagram illustrating a method of determining an LBT type for a Msg3 transmission according to an embodiment.

FIG. 11 is a signal flow diagram illustrating a method of determining an LBT type for a Msg3 transmission according to an embodiment.

In the embodiment of FIG. 11, an LBT type (or a channel access type) or an LBT category for an initial transmission (i.e., a first HARQ packet transmission of a HARQ process corresponding to a UL grant received in an RAR) and an LBT type (or a channel access type) or an LBT category for Msg3 retransmission (i.e., a subsequent HARQ packet transmission of the HARQ process corresponding to the UL grant received in the RAR) is same and is indicated in SI (e.g., in a RACH configuration) or an RCC RRC message.

In an embodiment, LBT type indicated in SI for transmission of Msg3 is one of LBT type 1 and LBT type 2. In this case LBT type field of 1 bit length can be added in SI wherein each of two code points (i.e. 0 and 1) of added field indicates one of LBT type 1 and LBT type 2. In another embodiment LBT category indicated in SI for transmission of Msg3 is one of LBT category 2 and LBT category 4. In this case LBT category field of 1 bit length can be added in SI wherein each of two code points (i.e. 0 and 1) of added field indicates one of LBT category 2 and LBT category 4. In another embodiment LBT category indicated in SI for transmission of Msg3 is one of LBT category 2 and LBT category 3. In this case LBT category field of 1 bit length can be added in SI wherein each of two code points (i.e. 0 and 1) of added field indicates one of LBT category 2 and LBT category 3. In another embodiment LBT category indicated in SI for transmission of Msg3 is one of LBT category 1, LBT category 2 and LBT category 4. In this case LBT category field of 2 bit length can be added in SI wherein each of three code points (e.g. 00, 01 and 10) of added field indicates one of LBT category 1, LBT category 2 and LBT category 4. Alternately 1 bit can indicate whether LBT is needed or not. Note that LBT is not needed means LBT category is 1. If LBT is needed, another bit can indicate LBT category 2 or LBT category 4. $2^{nd}$ bit may not be included in SI if $1^{st}$ bit indicates that LBT is not needed. In another embodiment LBT category indicated in SI for transmission of Msg3 is one of LBT category 1, LBT category 2 and LBT category 3. In this case LBT category field of 2 bit length can be added in SI wherein each of three code points (e.g. 00, 01 and 10) of added field indicates one of LBT category 1, LBT category 2 and LBT category 3. Alternately 1 bit can indicate whether LBT is needed or not. Note that LBT is not needed means LBT category is 1. If LBT is needed another bit in SI indicate LBT category 2 or LBT category 3. $2^{nd}$ bit may not be included in SI if $1^{st}$ bit indicates that LBT is not needed. In another embodiment LBT category indicated in SI for transmission of Msg3 is one of LBT category 1, LBT category 2, LBT category 3 and LBT category 4. In this case LBT category field of 2 bit length can be added in SI wherein each of three code points (e.g. 00, 01, 10 and 11) of added field indicates one of LBT category 1, LBT category 2, LBT category 3 and LBT category 4.

Referring to FIG. 11, in step 1105, the UE receives SI or an RRC message indicating an LBT type or category.

In step 1110, the UE transmits a RACH preamble (or a random access preamble) and then monitors a PDCCH addressed to an RA-RNTI in an RAR window for receiving an RAR.

Upon receiving the RAR corresponding to the RACH preamble in step 1115, the UE performs the LBT procedure as according to the type or category indicated in the received SI or RRC message in step 1120 and transmits an initial Msg3 transmission in step 1125.

The RAR corresponds to the RACH preamble transmitted by UE, if the TB scheduled by the PDCCH addressed to an RA-RNTI includes the RAR, wherein RAPID in the received RAR is equal to RAPID of RACH preamble transmitted by UE.

After transmitting the initial transmission of Msg3 in a UL grant received in the RAR in step 1125, the UE monitors for the PDCCH addressed to a TC-RNTI. The PDCCH addressed to the TC-RNTI may indicate a UL grant for retransmission of Msg3 or may indicate a DL TB carrying Msg4.

If the UE receives the PDCCH for retransmitting the Msg3 in step 1130, the UE performs the LBT procedure according to the LBT type or category indicated in the received SI or RRC message in step 1135 and retransmits Msg3 in step 1140.

If the LBT type (or channel access type) indicated in the received SI or RRC message is 1 or if the LBT category indicated in the received SI or RRC message is 3 or 4, the CAPC to determine the channel access parameters (e.g., m, CW size, etc.) for the LBT procedure may also be indicated in the SI or RRC message.

Alternatively, the CAPC is not indicated in the SI or RRC message, but is pre-defined.

The CAPC may also be determined based on Msg3 content (e.g., a logical channel or a MAC SDU, a MAC CE, etc.).

Mapping between the CAPCs and logical channels can be pre-defined or signaled in the SI or the RRC message. Typically, Msg3 will carry a MAC SDU for SRBs. For SRB 0, SRB 1, and SRB 3, the CAPC can be pre-defined, i.e., a highest priority CAPC (or a lowest CAPC index), whereas for SRB 2, the CAPC can be configured via an RRC message.

CAPC can be pre-defined or signaled for MAC CEs. For example, the CAPC for a MAC CE can be a highest priority CAPC (or a lowest CAPC index). As another example, CAPC for Msg3 transmission can be determined based on an event that triggered the random access procedure. For example, if a random access procedure is triggered because of a handover or for beam failure recovery, a highest priority CAPC (or a lowest CAPC index) can be used.

The LBT type or category in the SI or the RRC message can also be optional. For example, if the LBT type or category is not received in the SI or the RRC message, the UE may perform the LBT procedure using a pre-defined LBT type or category.

Embodiment 2-7

In this embodiment, an LBT type (or a channel access type) or an LBT category for an initial transmission (i.e., a first HARQ packet transmission of a HARQ process corresponding to a UL grant received in an RAR) and an LBT type (or a channel access type) or an LBT category for Msg3 retransmission (i.e., a subsequent HARQ packet transmission of the HARQ process corresponding to the UL grant received in the RAR) is same and is determined based on content of Msg3.

In the embodiments described above in which the LBT type or the LBT category is indicated in SI or an RRC message, the LBT type or LBT category in the SI or the RRC message can be signaled per bandwidth part (BWP).

In case of a 2 step contention based random access (CBRA), upon transmitting MsgA (i.e., a physical random access channel (PRACH) preamble and a PUSCH payload), the UE may receive fallback RAR, wherein the fallback RAR includes RAPID, a TA command, TC-RNTI, and a UL grant. Fallback RAR content is same as content of RAR in a 4 step CBRA procedure. In this case, the UE transmits Msg3 in a UL grant received in fallback RAR. The above-described embodiments can be applied for initial and retransmission of Msg3 in case of a 2 step CBRA.

As described above, the UE can determine an LBT type for a Msg3 initial transmission and retransmission according to various embodiments. An LBT type or a channel access type for a UL grant received in an RAR of a contention free random access or in an RAR of a 2-step contention based random access should be also considered.

Embodiment 3-1

Figure 12:
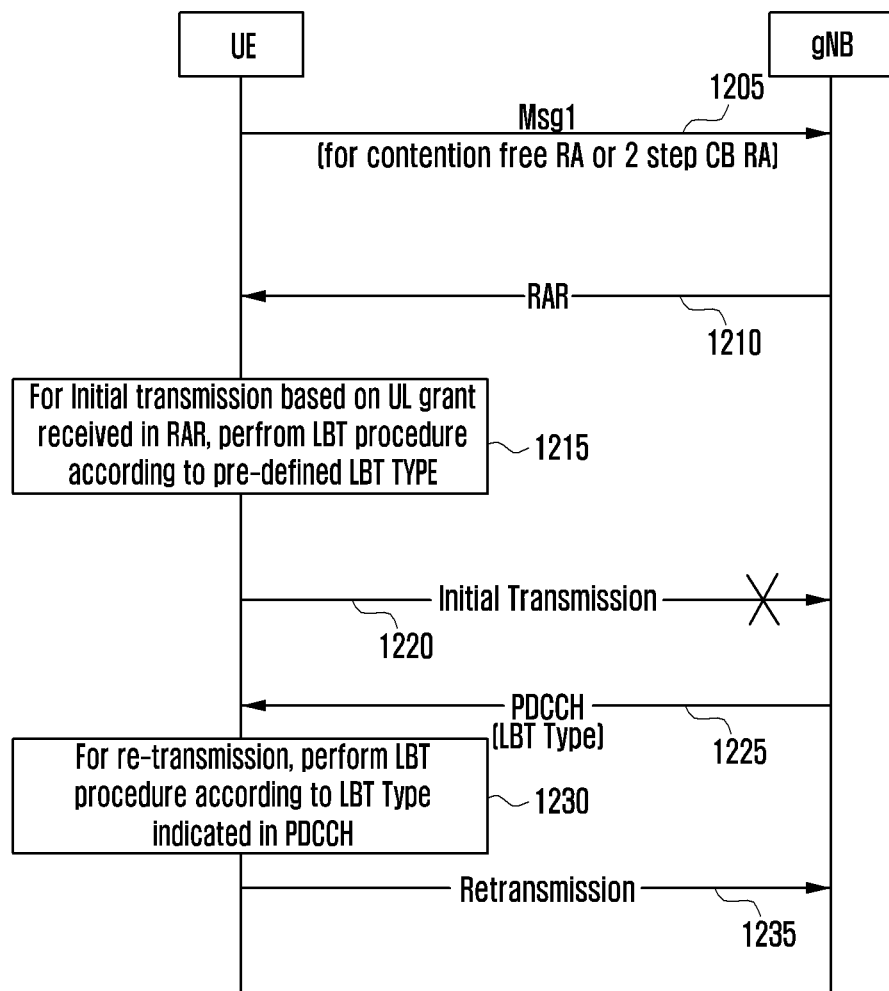
FIG. 12 is a signal flow diagram illustrating a method of determining an LBT type for a Msg3 transmission according to an embodiment.

FIG. 12 is a signal flow diagram illustrating a method of determining an LBT type for a Msg3 transmission according to an embodiment.

In the embodiment of FIG. 12, an LBT type (or a channel access type) or an LBT category for an initial transmission (i.e., first HARQ packet transmission of a HARQ process corresponding to a UL grant received in an RAR) based on a UL grant received in an RAR is pre-defined and an LBT type (or a channel access type) or an LBT category for a retransmission (i.e., a subsequent HARQ packet transmission of the HARQ process corresponding to the UL grant received in the RAR) is indicated in PDCCH, which includes the scheduling information for the retransmission.

The LBT type pre-defined for the initial transmission (i.e., a first HARQ packet transmission of a HARQ process corresponding to a UL grant received in an RAR) may be LBT type 1 or LBT type 2.

The LBT category pre-defined for the initial transmission may be LBT category 2 or LBT category 4.

The LBT category pre-defined for the initial transmission may be LBT category 2 or LBT category 3.

The LBT category pre-defined for the initial transmission may be LBT category 1, LBT category 2, or LBT category 4.

The LBT category pre-defined for the initial transmission may be LBT category 1, LBT category 2, or LBT category 3.

The LBT category pre-defined for the initial transmission may be LBT category 1, LBT category 2, LBT category 3, or LBT category 4.

The LBT type indicated in a PDCCH for re-transmission (i.e., a subsequent HARQ packet transmission of the HARQ process corresponding to the UL grant received in the RAR) may be LBT type 1 or LBT type 2. In this case, an LBT type field of a 1 bit length can be added in the PDCCH, wherein two code points (i.e., 0 and 1) of the added field indicate one of LBT type 1 and LBT type 2, respectively.

The LBT category indicated in the PDCCH for the re-transmission may be LBT category 2 or LBT category 4. In this case, the LBT category field of a 1 bit length can be added in the PDCCH, wherein two code points (i.e., 0 and 1) of the added field indicate one of LBT category 2 and LBT category 4, respectively.

The LBT category indicated in the PDCCH for the re-transmission may be LBT category 2 or LBT category 3. In this case, the LBT category field of a 1 bit length can be added in the PDCCH, wherein two code points (i.e., 0 and 1) of the added field indicate one of LBT category 2 and LBT category 3, respectively.

The LBT category indicated in the PDCCH for the re-transmission may be LBT category 1, LBT category 2, or LBT category 4. In this case, LBT category field of a 2 bit length can be added in the PDCCH, wherein three code points (e.g., 00, 01, and 10) of the added field indicates one of LBT category 1, LBT category 2, and LBT category 4, respectively.

Alternatively, 1 bit can indicate whether LBT is needed or not. When LBT is not needed, the LBT category is 1. If LBT is needed, another bit can indicate LBT category 2 or LBT category 4. A $2^{nd}$ bit may be omitted from the PDCCH if a $1^{st}$ bit indicates that the LBT is not needed.

The LBT category indicated in the PDCCH for the re-transmission may be LBT category 1, LBT category 2, or LBT category 3. In this case, the LBT category field of a 2 bit length can be added in the PDCCH, wherein three code points (e.g., 00, 01, and 10) of the added field indicate one of LBT category 1, LBT category 2, and LBT category 3, respectively.

Alternatively, 1 bit can indicate whether LBT is needed or not. When LBT is not needed, the LBT category is 1. If LBT is needed, another bit in the PDCCH indicates LBT category 2 or LBT category 3. A $2^{nd}$ bit may be omitted from the PDCCH if a $1^{st}$ bit indicates that LBT is not needed.

The LBT category indicated in the PDCCH for the re-transmission may be LBT category 1, LBT category 2, LBT category 3, and LBT category 4. In this case, the LBT category field of a 2 bit length can be added in the PDCCH, wherein four code points (e.g., 00, 01, 10, and 11) of the added field indicate one of LBT category 1, LBT category 2, LBT category 3, and LBT category 4, respectively.

Referring to FIG. 12, the UE transmits Msg1 including a RACH preamble in step 1205.

In step 1210, upon receiving the RAR corresponding to the RACH preamble in step 1210, the UE performs the LBT procedure of pre-defined type or category in step 1215 and transmits an initial transmission based on a UL grant received in the RAR in step 1220. If the LBT type (or the channel access type) pre-defined for the initial transmission based on the UL grant received in the RAR is 1 or if the pre-defined category for the initial transmission is 3 or 4, the CAPC to determine the channel access parameters (e.g., m, CW size, etc.) for the LBT procedure may also be pre-defined.

After transmitting the initial transmission in UL grant received in the RAR in step 1220, the UE monitors the PDCCH.

If the UE receives the PDCCH indicating retransmission in step 1225, the UE performs the LBT procedure as indicated in the PDCCH in step 1230 and retransmits the HARQ packet in step 1235.

If the LBT type (or the channel access type) indicated in the PDCCH is 1 or if the LBT category indicated in the PDCCH is 3 or 4, the CAPC to determine the channel access parameters (e.g., m, CW size, etc.) for the LBT procedure may also be indicated in the PDCCH.

Alternatively, the CAPC is not indicated in the PDCCH, but is pre-defined or indicated in SI or an RRC message. As another example, the CAPC can be determined based on MAC packet data unit (PDU) content (e.g., a logical channel or a MAC SDU, a MAC CE, etc.).

Mapping between the CAPCs and logical channels can be pre-defined or signaled in SI or an RRC message. Typically, Msg3 will carry a MAC SDU for SRBs. For SRB 0, SRB 1, and SRB 3, the CAPC can be pre-defined, i.e., a highest priority CAPC (or a lowest CAPC index), whereas for SRB 2, the CAPC can be configured via an RRC message.

CAPC can be pre-defined or signaled for MAC CEs. For example, the CAPC for a MAC CE can be a highest priority CAPC (or a lowest CAPC index). As another example, the CAPC for Msg3 transmission can be determined based on an event that triggered the random access procedure. For example, if a random access procedure is triggered because of a handover or for beam failure recovery, a highest priority CAPC (or a lowest CAPC index) can be used.

Alternatively, the LBT type or category in the PDCCH can be optional. For example, if the LBT type or category is not received in the PDCCH that includes the scheduling information for the retransmission, the UE may perform the LBT procedure of pre-defined type or category and re-transmit the HARQ packet.

Embodiment 3-2

Figure 13:
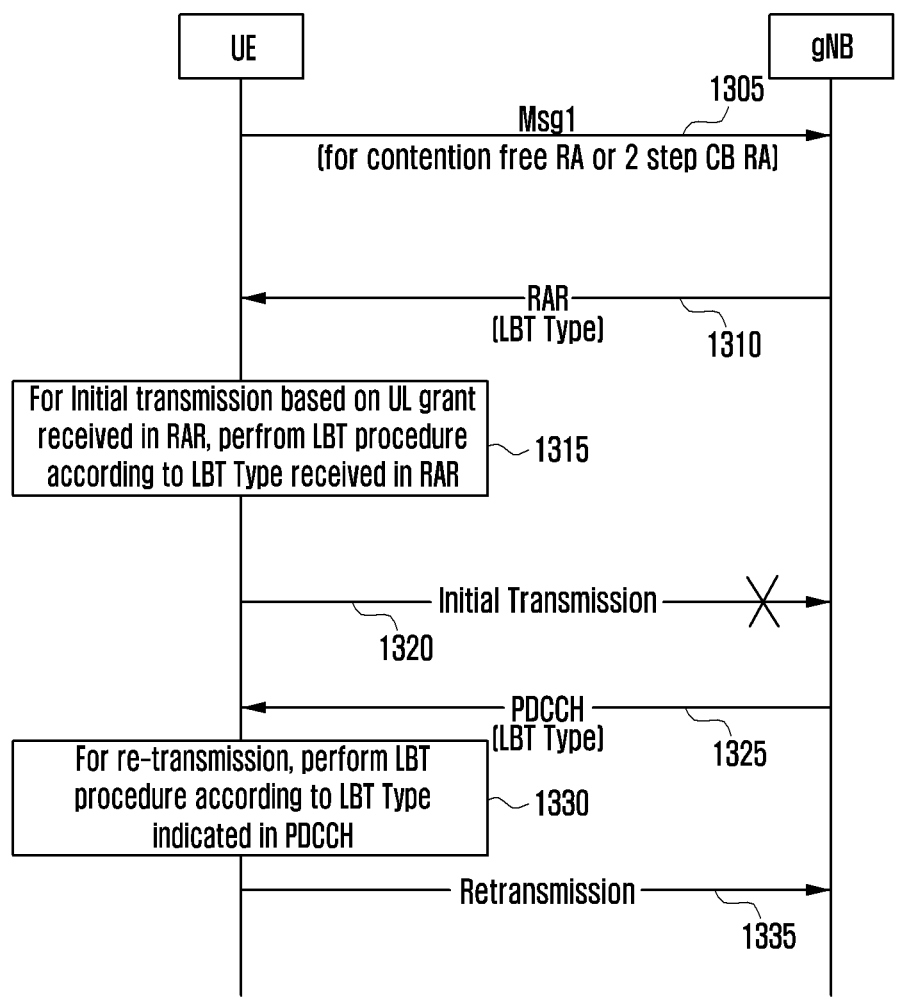
FIG. 13 is a signal flow diagram illustrating a method of determining an LBT type for a Msg3 transmission according to an embodiment.

FIG. 13 is a signal flow diagram illustrating a method of determining an LBT type for a Msg3 transmission according to an embodiment.

In the embodiment of FIG. 13, an LBT type (or a channel access type) or an LBT category for an initial transmission (i.e., a first HARQ packet transmission of a HARQ process corresponding to a UL grant received in an RAR) based on a UL grant received in an RAR is indicated in the RAR and an LBT type (or a channel access type) or an LBT category for retransmission (i.e., a subsequent HARQ packet transmissions of the HARQ process corresponding to the UL grant received in the RAR) is indicated in a PDCCH scheduling the retransmission.

The LBT type indicated in the RAR for the initial transmission may be LBT type 1 or LBT type 2. In this case, an LBT type field of a 1 bit length can be added in the RAR, wherein two code points (i.e., 0 and 1) of the added field indicate one of LBT type 1 and LBT type 2, respectively.

The LBT category indicated in the RAR for the initial transmission may be LBT category 2 or LBT category 4. In this case, the LBT category field of a 1 bit length can be added in the RAR, wherein code points (i.e., 0 and 1) of the added field indicate one of LBT category 2 and LBT category 4, respectively.

The LBT category indicated in the RAR for the initial transmission may be LBT category 2 or LBT category 3. In this case, the LBT category field of a 1 bit length can be added in the RAR, wherein the two code points (i.e., 0 and 1) of the added field indicate one of LBT category 2 and LBT category 3, respectively.

The LBT category indicated in the RAR for the initial transmission may be LBT category 1, LBT category 2, or LBT category 4. In this case, the LBT category field of a 2 bit length can be added in the RAR, wherein three code points (e.g. 00, 01, and 10) of the added field indicate one of LBT category 1, LBT category 2, and LBT category 4, respectively.

Alternatively, 1 bit can indicate whether LBT is needed or not. When LBT is not needed, the LBT category is 1. If the LBT is needed, another bit can indicate LBT category 2 or LBT category 4. A $2^{nd}$ bit may be omitted from the RAR if a $1^{st}$ bit indicates that the LBT is not needed.

The LBT category indicated in the RAR for the initial transmission may be LBT category 1, LBT category 2, or LBT category 3. In this case, the LBT category field of a 2 bit length can be added in the RAR, wherein three code points (e.g. 00, 01, and 10) of the added field indicate one of LBT category 1, LBT category 2, and LBT category 3, respectively.

Alternatively, 1 bit can indicate whether LBT is needed or not. When LBT is not, the LBT category is 1. If LBT is needed, another bit can indicate LBT category 2 or LBT category 3. A $2^{nd}$ bit may be omitted from the RAR if a $1^{st}$ bit indicates that the LBT is not needed.

The LBT category indicated in the RAR for the initial transmission may be LBT category 1, LBT category 2, LBT category 3, or LBT category 4. In this case, the LBT category field of a 2 bit length can be added in the RAR, wherein four code points (e.g., 00, 01, 10, and 11) of the added field indicate one of LBT category 1, LBT category 2, LBT category 3, and LBT category 4, respectively.

The LBT type or category indicated in a PDCCH for re-transmission may be the same as described in Embodiment 3-1. Accordingly, a repetitive description will not be provided again.

Referring to FIG. 13, the UE transmits Msg1 including a RACH preamble in step 1305.

Upon receiving a RAR corresponding to Msg1 in step 1310, the UE performs the LBT procedure according to LBT type or category as indicated in the RAR in step 1315 and transmits an initial transmission in step 1320.

If the LBT type (or the channel access type) indicated in the RAR is 1 or if the LBT category indicated in the RAR is 3 or 4, the CAPC to determine the channel access parameters (e.g., m, CW size, etc.) for the LBT procedure may also be indicated in the RAR.

Alternatively, the CAPC is not indicated in the RAR, but is pre-defined or indicated in SI or an RRC message.

As another example, the CAPC can be determined based on MAC PDU content (e.g., a logical channel of a MAC SDU, a MAC CE, etc.).

Mapping between CAPCs and logical channels can be pre-defined or signaled in SI or an RRC message. Typically, Msg3 will carry a MAC SDU for SRBs. For SRB 0, SRB 1, and SRB 3, the CAPC can be pre-defined, i.e., a highest priority CAPC (or a lowest CAPC index), whereas for SRB 2, the CAPC can be configured via an RRC message.

CAPC can be pre-defined or signaled for MAC CEs. For example, the CAPC for a MAC CE can be a highest priority CAPC (or a lowest CAPC index). As another example, the CAPC for Msg3 transmission can be determined based on an event that triggered the random access procedure.

After transmitting the initial transmission in a UL grant received in the RAR in step 1320, the UE monitors a PDCCH.

If the UE receives the PDCCH for retransmitting the HARQ packet in step 1325, the UE performs the LBT procedure as indicated in the PDCCH in step 1330 and retransmits the HARQ packet in step 1335.

If the LBT type (or the channel access type) indicated in the PDCCH is 1 or of the LBT category indicated in the PDCCH is 3 or 4, the CAPC to determine the channel access parameters (e.g., m, CW size, etc.) for the LBT procedure may also be indicated in PDCCH.

Alternatively, the CAPC is not indicated in the PDCCH, but is pre-defined or indicated in SI or an RRC message.

In another example, the CAPC can be determined based on MAC PDU content (e.g., a logical channel of a MAC SDU, a MAC CE, etc.).

Mapping between CAPCs and logical channels can be pre-defined or signaled in SI or an RRC message. Typically, Msg3 will carry a MAC SDU for SRBs. For SRB 0, SRB 1, and SRB 3, the CAPC can be pre-defined, i.e., a highest priority CAPC (or a lowest CAPC index), whereas for SRB 2, the CAPC can be configured via an RRC message.

CAPC can be pre-defined or signaled for MAC CEs. For example, the CAPC for a MAC CE can be a highest priority CAPC (or a lowest CAPC index). As another example, the CAPC for Msg3 transmission can be determined based on an event that triggered the random access procedure. For example, if a random access procedure is triggered because of a handover or for beam failure recovery, a highest priority CAPC (or a lowest CAPC index) can be used.

The LBT type or category in the PDCCH can also be optional. For example, if the LBT type or category is not received in the PDCCH that includes the scheduling information for the retransmission, the UE may perform the same LBT procedure as used for the initial transmission and re-transmit the HARQ packet.

The LBT type or category in the RAR can also be optional. For example, if the LBT type or category is not received in the RAR, the UE may perform the LBT procedure using the LBT type or category pre-defined or signaled in SI or an RRC message.

Embodiment 3-3

Figure 14:
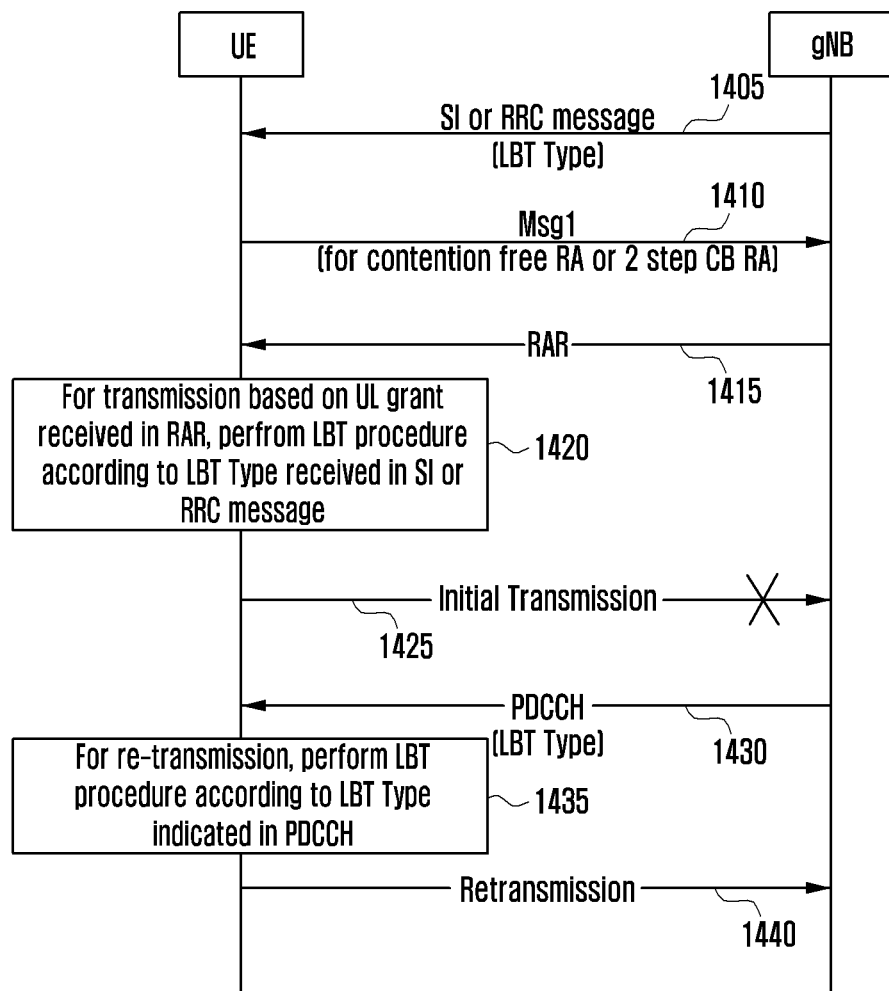
FIG. 14 is a signal flow diagram illustrating a method of determining an LBT type for a Msg3 transmission according to an embodiment.

FIG. 14 is a signal flow diagram illustrating a method of determining an LBT type for a Msg3 transmission according to an embodiment.

In the embodiment of FIG. 14, an LBT type (or a channel access type) or an LBT category for an initial transmission based on a UL grant received in an RAR is indicated in SI or an RRC message and an LBT type (or a channel access type) or an LBT category for a retransmission (i.e., a first HARQ packet transmission of HARQ process corresponding to UL grant received in RAR) is indicated in a PDCCH scheduling the retransmission.

In an embodiment, LBT type indicated in SI/RRC message for initial transmission (i.e. first HARQ packet transmission of HARQ process corresponding to UL grant received in RAR) is one of LBT type 1 and LBT type 2. In this case LBT type field of 1 bit length can be added in SI/RRC message wherein each of two code points (i.e. 0 and 1) of added field indicates one of LBT type 1 and LBT type 2. In another embodiment LBT category indicated in SI/RRC message for initial transmission is one of LBT category 2 and LBT category 4. In this case LBT category field of 1 bit length can be added in SI/RRC message wherein each of two code points (i.e. 0 and 1) of added field indicates one of LBT category 2 and LBT category 4. In another embodiment LBT category indicated in SI/RRC message for initial transmission is one of LBT category 2 and LBT category 3. In this case LBT category field of 1 bit length can be added in SI/RRC message wherein each of two code points (i.e. 0 and 1) of added field indicates one of LBT category 2 and LBT category 3. In another embodiment LBT category indicated in SI/RRC message for initial transmission is one of LBT category 1, LBT category 2 and LBT category 4. In this case LBT category field of 2 bit length can be added in SI/RRC message wherein each of three code points (e.g. 00, 01 and 10) of added field indicates one of LBT category 1, LBT category 2 and LBT category 4. Alternately 1 bit can indicate whether LBT is needed or not. Note that LBT is not needed means LBT category is 1. If LBT is needed, another bit can indicate LBT category 2 or LBT category 4. $2^{nd}$ bit may not be included in SI/RRC message if $1^{st}$ bit indicates that LBT is not needed. In another embodiment LBT category indicated in SI/RRC message for initial transmission is one of LBT category 1, LBT category 2 and LBT category 3. In this case LBT category field of 2 bit length can be added in SI/RRC message wherein each of three code points (e.g. 00, 01 and 10) of added field indicates one of LBT category 1, LBT category 2 and LBT category 4. Alternately 1 bit can indicate whether LBT is needed or not. Note that LBT is not needed means LBT category is 1. If LBT is needed, another bit can indicate LBT category 2 or LBT category 4. $2^{nd}$ bit may not be included in SI/RRC message if $1^{st}$ bit indicates that LBT is not needed. In another embodiment LBT category indicated in SI/RRC message for initial transmission is one of LBT category 1, LBT category 2, LBT category 3 and LBT category 4. In this case LBT category field of 2 bit length can be added in PDCCH wherein each of three code points (e.g. 00, 01, 10 and 11) of added field indicates one of LBT category 1, LBT category 2, LBT category 3 and LBT category 4.

In an embodiment, LBT type indicated in PDCCH for re-transmission (subsequent HARQ packet transmission of HARQ process corresponding to UL grant received in RAR) is one of LBT type 1 and LBT type 2. In this case LBT type field of 1 bit length can be added in PDCCH wherein each of two code points (i.e. 0 and 1) of added field indicates one of LBT type 1 and LBT type 2. In an embodiment LBT category indicated in PDCCH for re-transmission is one of LBT category 2 and LBT category 4. In this case LBT category field of 1 bit length can be added in PDCCH wherein each of two code points (i.e. 0 and 1) of added field indicates one of LBT category 2 and LBT category 4. In another embodiment LBT category indicated in PDCCH for re-transmission is one of LBT category 2 and LBT category 3. In this case LBT category field of 1 bit length can be added in PDCCH wherein each of two code points (i.e. 0 and 1) of added field indicates one of LBT category 2 and LBT category 3. In another embodiment LBT category indicated in PDCCH for re-transmission is one of LBT category 1, LBT category 2 and LBT category 4. In this case LBT category field of 2 bit length can be added in PDCCH wherein each of three code points (e.g. 00, 01 and 10) of added field indicates one of LBT category 1, LBT category 2 and LBT category 4. Alternately 1 bit can indicate whether LBT is needed or not. Note that LBT is not needed means LBT category is 1. If LBT is needed, another bit can indicate LBT category 2 or LBT category 4. $2^{nd}$ bit may not be included in PDCCH if $1^{st}$ bit indicates that LBT is not needed. In another embodiment LBT category indicated in PDCCH for re-transmission is one of LBT category 1, LBT category 2 and LBT category 3. In this case LBT category field of 2 bit length can be added in PDCCH wherein each of three code points (e.g. 00, 01 and 10) of added field indicates one of LBT category 1, LBT category 2 and LBT category 3. Alternately 1 bit can indicate whether LBT is needed or not. Note that LBT is not needed means LBT category is 1. If LBT is needed another bit in PDCCH indicate LBT category 2 or LBT category 3. $2^{nd}$ bit may not be included in PDCCH if $1^{st}$ bit indicates that LBT is not needed. In another embodiment LBT category indicated in PDCCH for re-transmission is one of LBT category 1, LBT category 2, LBT category 3 and LBT category 4. In this case LBT category field of 2 bit length can be added in PDCCH wherein each of three code points (e.g. 00, 01, 10 and 11) of added field indicates one of LBT category 1, LBT category 2, LBT category 3 and LBT category 4.

Referring to FIG. 14, the UE receives SI or an RRC message including an indication of an LBT type or category in step 1405.

In step 1410, the UE transmits Msg1 including a RACH preamble.

Upon receiving an RAR corresponding to the RACH preamble in step 1415, the UE performs the LBT procedure according to LBT Type or category as indicated in the SI (e.g., in RACH configuration) or the RRC message in step 1420 and transmits an initial transmission in step 1425.

If the LBT type (or the channel access type) indicated in the SI or the RRC message is 1 or if the LBT category indicated in the SI or the RRC message is 3 or 4, the CAPC to determine the channel access parameters (e.g. m, CW size, etc.) for the LBT procedure is pre-defined or indicated in the SI or the RRC message.

Alternatively, the CAPC can be determined based on MAC PDU content (e.g., a logical channel a MAC SDU, a MAC CE, etc.).

Mapping between CAPCs and logical channels can be pre-defined or signaled in the SI or the RRC message. Typically, Msg3 will carry a MAC SDU for SRBs. For SRB 0, SRB 1m and SRB 3, the CAPC can be pre-defined, i.e., a highest priority CAPC (or a lowest CAPC index), whereas for SRB 2, the CAPC can be configured via an RRC message.

CAPC can be pre-defined or signaled for MAC CEs. For example, the CAPC for a MAC CE can be a highest priority CAPC (or a lowest CAPC index). As another example, the CAPC for Msg3 transmission can be determined based on an event that triggered the random access procedure. For example, if a random access procedure is triggered because of a handover or for beam failure recovery, a highest priority CAPC (or a lowest CAPC index) can be used.

After transmitting the initial transmission in a UL grant received in the RAR in step 1425, the UE monitors for a PDCCH.

If the UE receives a PDCCH for retransmitting the HARQ packet in step 1430, the UE performs the LBT procedure as indicated in the PDCCH in step 1435 and retransmits the HARQ packet in step 1440.

The LBT procedure as indicated in the SI or the RRC message in step 1405 may be applied for both Msg1 and Msg3.

If the LBT type (or the channel access type) indicated in the PDCCH is 1 or if the LBT category indicated in the PDCCH is 3 or 4, the CAPC to determine the channel access parameters for the LBT procedure may also be indicated in the PDCCH.

Alternatively, the CAPC is not indicated in the PDCCH, but it is pre-defined or indicated in the SI or the RRC message.

As another example, the CAPC can be determined based on MAC PDU content.

Mapping between CAPCs and logical channels can be pre-defined or signaled in the SI or the RRC message. Typically, Msg3 will carry a MAC SDU for SRBs. For SRB 0, SRB 1, and SRB 3, the CAPC can be pre-defined, whereas for SRB 2, the CAPC can be configured via an RRC message.

CAPC can be pre-defined or signaled for MAC CEs. For example, the CAPC for a MAC CE can be a highest priority CAPC (or a lowest CAPC index). As another example, the CAPC for Msg3 transmission can be determined based on an event that triggered the random access procedure. For example, if a random access procedure is triggered because of a handover or for beam failure recovery, a highest priority CAPC (or a lowest CAPC index) can be used.

The LBT type or category in the PDCCH can also be optional. For example, if the LBT type or category is not received in the PDCCH that includes the scheduling information for the retransmission, the UE may perform the same LBT procedure as used for an initial transmission and re-transmit the HARQ packet.

The LBT type or category in the SI or the RRC message can also be optional. For example, if the LBT type or category is not received in the SI or the RRC message, the UE may perform the LBT procedure using a pre-defined LBT type or category.

Embodiment 3-4

Figure 15:
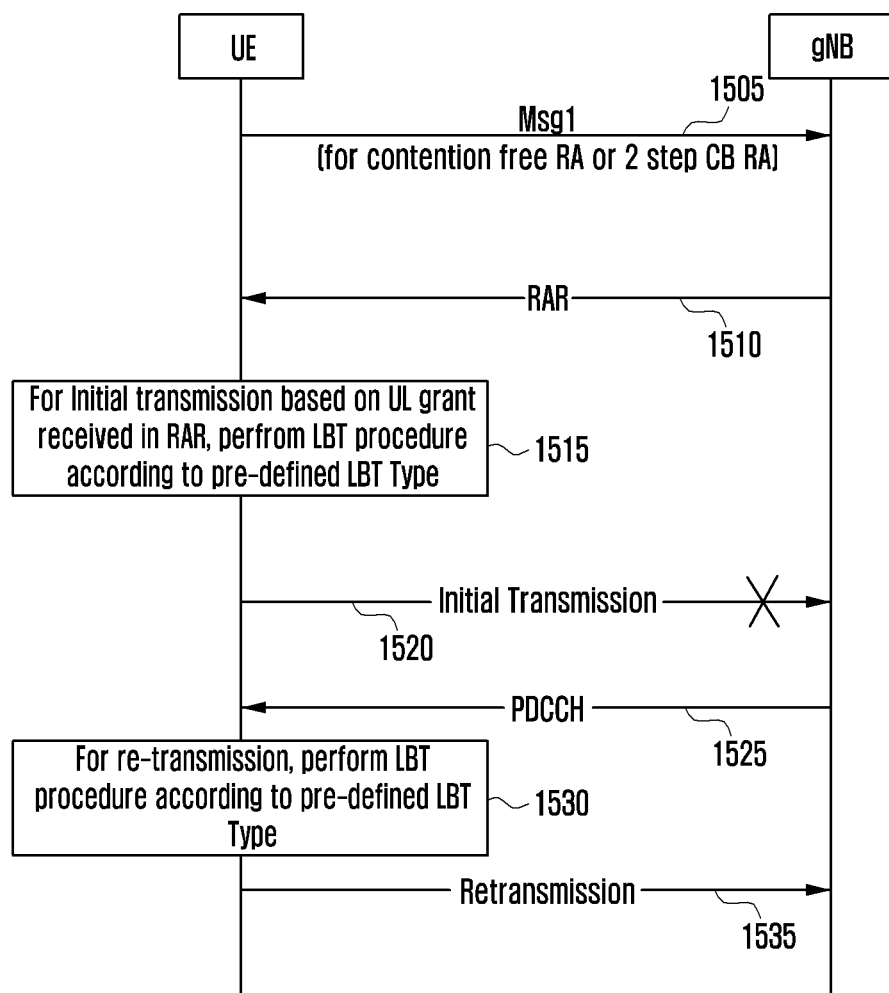
FIG. 15 is a signal flow diagram illustrating a method of determining an LBT type for a Msg3 transmission according to an embodiment.

FIG. 15 is a signal flow diagram illustrating a method of determining an LBT type for a Msg3 transmission according to an embodiment.

In the embodiment of FIG. 15, an LBT type (or a channel access type) or an LBT category for an initial transmission and an LBT type (or a channel access type) or an LBT category for a retransmissions of HARQ process corresponding to a UL grant received in an RAR is the same and is predefined.

The LBT type pre-defined for the initial transmission and the retransmission may be LBT type 1 or LBT type 2.

The LBT category pre-defined for the initial transmission and the retransmission may be LBT category 2 or LBT category 4.

The LBT category pre-defined for the initial transmission and the retransmission may be LBT category 2 or LBT category 3.

The LBT category pre-defined for the initial transmission and the retransmission may be LBT category 1, LBT category 2, or LBT category 4.

The LBT category pre-defined for the initial transmission and the retransmission may be LBT category 1, LBT category 2, or LBT category 3.

The LBT category pre-defined for the initial transmission and the retransmission may be LBT category 1, LBT category 2, LBT category 3, or LBT category 4.

Referring to FIG. 15, the UE transmits Msg1 including a RACH preamble in step 1505.

Upon receiving a RAR corresponding to the RACH preamble in step 1510, the UE performs an LBT procedure of a pre-defined type or category in step 1515 and transmits an initial transmission in step 1520.

After transmitting the initial transmission in a UL grant received in the RAR in step 1520, the UE monitors for a PDCCH.

If the UE receives the PDCCH for retransmitting the HARQ packet in step 1525, the UE performs the LBT procedure of pre-defined type or category in step 1530 and retransmits the HARQ packet in step 1535.

If the pre-defined LBT type (or channel access type) is 1 or if the predefined LBT category is 3 or 4, the CAPC to determine the channel access parameters for the LBT procedure may also be pre-defined.

Alternatively, the CAPC can be indicated in SI or an RRC message.

As another example, the CAPC can be determined based on MAC PDU content.

Mapping between CAPCs and logical channels can be pre-defined or signaled in SI or an RRC message. Typically, Msg3 will carry a MAC SDU for SRBs. For SRB 0, SRB 1, and SRB 3, the CAPC can be pre-defined, i.e., a highest priority CAPC (or a lowest CAPC index), whereas for SRB 2, the CAPC can be configured via an RRC message.

CAPC can be pre-defined or signaled for MAC CEs. For example, the CAPC for a MAC CE can be a highest priority CAPC (or a lowest CAPC index). As another example, the CAPC for Msg3 transmission can be determined based on an event that triggered the random access procedure For example, if a random access procedure is triggered because of a handover or for beam failure recovery, a highest priority CAPC (or a lowest CAPC index) can be used.

Embodiment 3-5

Figure 16:
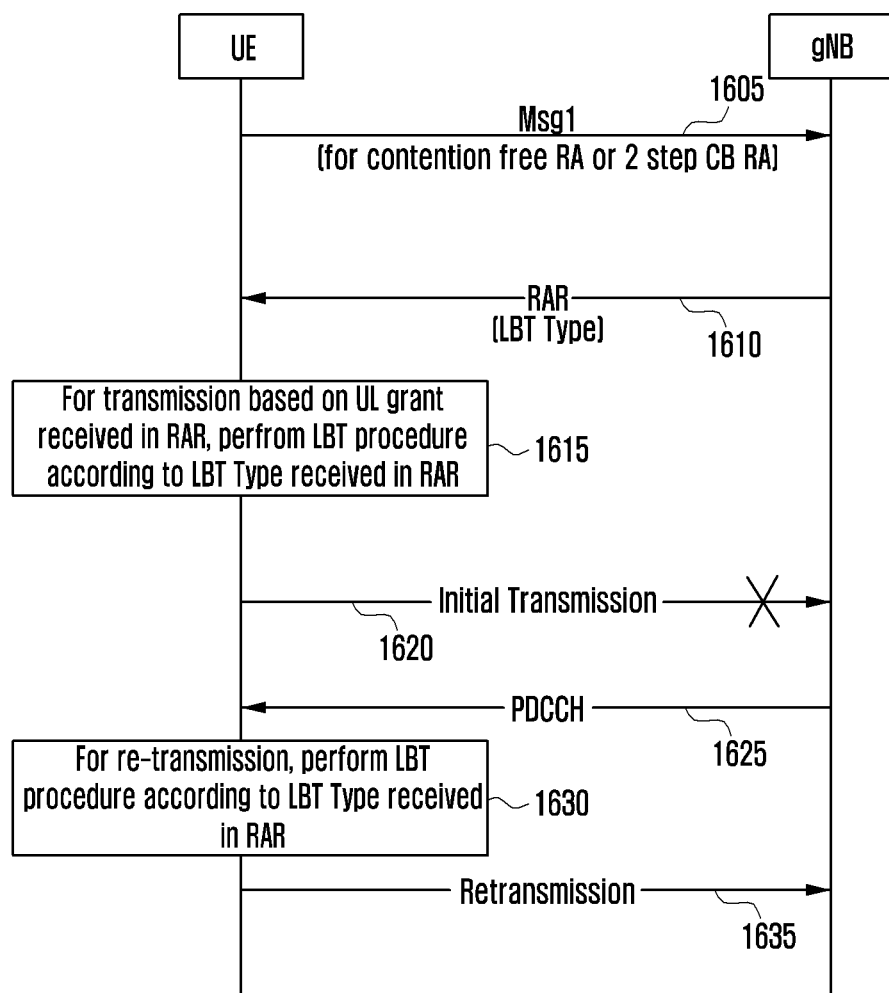
FIG. 16 is a signal flow diagram illustrating a method of determining an LBT type for a Msg3 transmission according to an embodiment.

FIG. 16 is a signal flow diagram illustrating a method of determining an LBT type for a Msg3 transmission according to an embodiment.

In the embodiment of FIG. 16, an LBT type (or a channel access type) or category for an initial transmission and an LBT type (or channel access type) or category for retransmission of a HARQ process corresponding to a UL grant received in an RAR is the same and is indicated in the RAR.

In an embodiment, LBT type indicated in RAR for transmission is one of LBT type 1 and LBT type 2. In this case LBT type field of 1 bit length can be added in RAR wherein each of two code points (i.e. 0 and 1) of added field indicates one of LBT type 1 and LBT type 2. In another embodiment LBT category indicated in RAR for transmission is one of LBT category 2 and LBT category 4. In this case LBT category field of 1 bit length can be added in RAR wherein each of two code points (i.e. 0 and 1) of added field indicates one of LBT category 2 and LBT category 4. In another embodiment LBT category indicated in RAR for transmission is one of LBT category 2 and LBT category 3. In this case LBT category field of 1 bit length can be added in RAR wherein each of two code points (i.e. 0 and 1) of added field indicates one of LBT category 2 and LBT category 3. In another embodiment LBT category indicated in RAR for transmission is one of LBT category 1, LBT category 2 and LBT category 4. In this case LBT category field of 2 bit length can be added in RAR wherein each of three code points (e.g. 00, 01 and 10) of added field indicates one of LBT category 1, LBT category 2 and LBT category 4. Alternately 1 bit can indicate whether LBT is needed or not. Note that LBT is not needed means LBT category is 1. If LBT is needed, another bit can indicate LBT category 2 or LBT category 4. $2^{nd}$ bit may not be included in RAR if $1^{st}$ bit indicates that LBT is not needed. In another embodiment LBT category indicated in RAR for transmission is one of LBT category 1, LBT category 2 and LBT category 3. In this case LBT category field of 2 bit length can be added in RAR wherein each of three code points (e.g. 00, 01 and 10) of added field indicates one of LBT category 1, LBT category 2 and LBT category 3. Alternately 1 bit can indicate whether LBT is needed or not. Note that LBT is not needed means LBT category is 1. If LBT is needed another bit in RAR indicate LBT category 2 or LBT category 3. $2^{nd}$ bit may not be included in RAR if $1^{st}$ bit indicates that LBT is not needed. In another embodiment LBT category indicated in RAR for transmission is one of LBT category 1, LBT category 2, LBT category 3 and LBT category 4. In this case LBT category field of 2 bit length can be added in RAR wherein each of three code points (e.g., 00, 01, 10, and 11) of added field indicates one of LBT category 1, LBT category 2, LBT category 3 and LBT category 4.

Referring to FIG. 16, the UE transmits Msg1 including a RACH preamble in step 1605.

Upon receiving a RAR corresponding to the RACH preamble in step 1610, the UE performs the LBT procedure as indicated in the RAR in step 1615 and transmits an initial transmission in step 1620.

If UE receives a PDCCH for retransmitting the HARQ packet in step 1625, the UE performs the LBT procedure as indicated in the RAR in step 1630 and retransmits the HARQ packet in step 1635.

If the LBT type (or channel access type) indicated in the RAR is 1 or if the LBT category indicated in the RAR is 3 or 4, the CAPC to determine the channel access parameters for the LBT procedure may also be indicated in the RAR.

Alternatively, the CAPC is not indicated in the RAR, but is pre-defined or indicated in SI or an RRC message.

As another example, the CAPC can be determined based on MAC PDU content.

Mapping between CAPCs and logical channels can be pre-defined or signaled in SI or an RRC message. Typically, Msg3 will carry MAC SDU for SRBs. For SRB 0, SRB 1, and SRB 3, the CAPC can be pre-defined, i.e., a highest priority CAPC (or a lowest CAPC index), whereas for SRB 2, the CAPC can be configured via an RRC message.

CAPC can be pre-defined or signaled for MAC CEs. For example, the CAPC for a MAC CE can be a highest priority CAPC (or a lowest CAPC index).

As another example, CAPC for Msg3 transmission can be determined based on an event that triggered the random access procedure. For example, if a random access procedure is triggered because of a handover or for beam failure recovery, a highest priority CAPC (or a lowest CAPC index) can be used.

The LBT type or category in the RAR can be optional. For example, if the LBT type or category is not received in the RAR, the UE may perform the LBT procedure using an LBT type or category that is pre-defined or signaled in SI or an RRC message.

Embodiment 3-6

Figure 17:
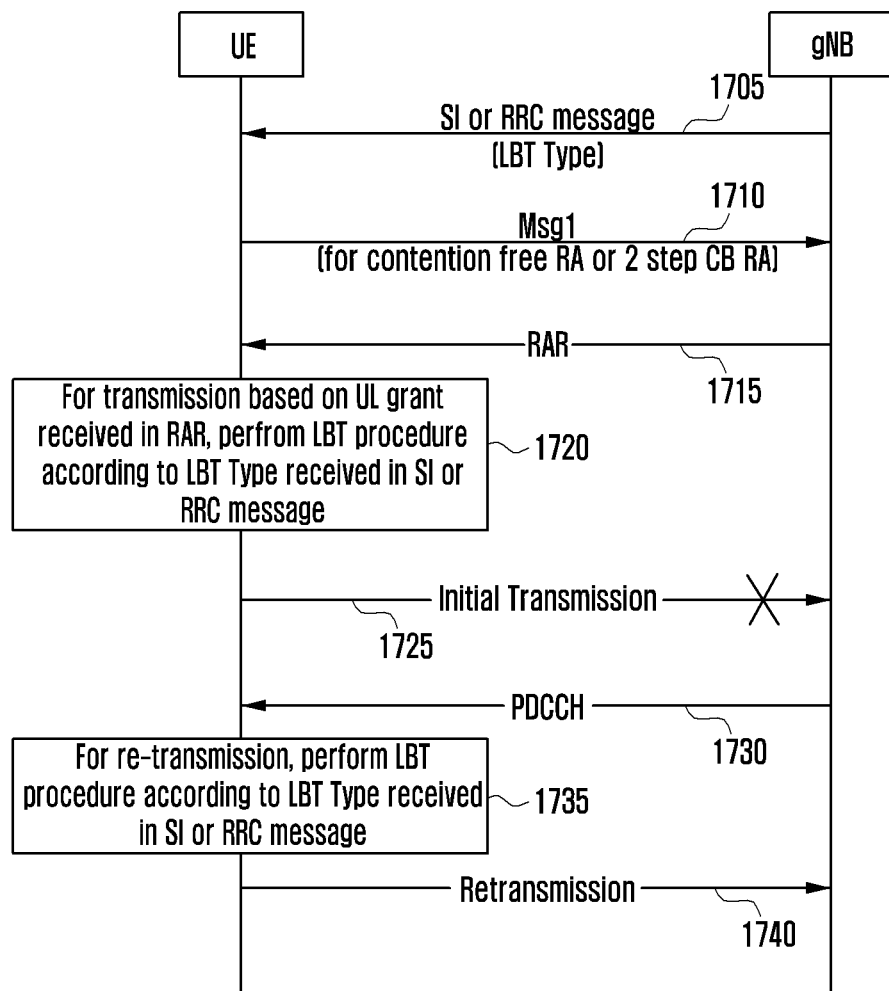
FIG. 17 is a signal flow diagram illustrating a method of determining an LBT type for a Msg3 transmission according to an embodiment.

FIG. 17 is a signal flow diagram illustrating a method of determining an LBT type for a Msg3 transmission according to an embodiment.

In the embodiment of FIG. 17, an LBT type (or a channel access type) or an LBT category for an initial transmission and an LBT type (or a channel access type) or an LBT category for HARQ packet retransmissions of HARQ process corresponding to a UL grant received in an RAR is the same and is indicated in SI (e.g., in RACH configuration) or an RRC message.

In an embodiment, LBT type indicated in SI for transmission is one of LBT type 1 and LBT type 2. In this case LBT type field of 1 bit length can be added in SI wherein each of two code points (i.e. 0 and 1) of added field indicates one of LBT type 1 and LBT type 2. In another embodiment LBT category indicated in SI for transmission is one of LBT category 2 and LBT category 4. In this case LBT category field of 1 bit length can be added in SI wherein each of two code points (i.e. 0 and 1) of added field indicates one of LBT category 2 and LBT category 4. In another embodiment LBT category indicated in SI for transmission is one of LBT category 2 and LBT category 3. In this case LBT category field of 1 bit length can be added in SI wherein each of two code points (i.e. 0 and 1) of added field indicates one of LBT category 2 and LBT category 3. In another embodiment LBT category indicated in SI for transmission is one of LBT category 1, LBT category 2 and LBT category 4. In this case LBT category field of 2 bit length can be added in SI wherein each of three code points (e.g. 00, 01 and 10) of added field indicates one of LBT category 1, LBT category 2 and LBT category 4. Alternately 1 bit can indicate whether LBT is needed or not. Note that LBT is not needed means LBT category is 1. If LBT is needed, another bit can indicate LBT category 2 or LBT category 4. $2^{nd}$ bit may not be included in SI if $1^{st}$ bit indicates that LBT is not needed. In another embodiment LBT category indicated in SI for transmission is one of LBT category 1, LBT category 2 and LBT category 3. In this case LBT category field of 2 bit length can be added in SI wherein each of three code points (e.g. 00, 01 and 10) of added field indicates one of LBT category 1, LBT category 2 and LBT category 3. Alternately 1 bit can indicate whether LBT is needed or not. Note that LBT is not needed means LBT category is 1. If LBT is needed another bit in SI indicate LBT category 2 or LBT category 3. $2^{nd}$ bit may not be included in SI if $1^{st}$ bit indicates that LBT is not needed. In another embodiment LBT category indicated in SI for transmission is one of LBT category 1, LBT category 2, LBT category 3 and LBT category 4. In this case LBT category field of 2 bit length can be added in SI wherein each of three code points (e.g. 00, 01, 10 and 11) of added field indicates one of LBT category 1, LBT category 2, LBT category 3 and LBT category 4.

Referring to FIG. 17, the UE receives SI or an RRC message including an indication of an LBT type or category in step 1705.

In step 1710, the UE transmits Msg1 including a RACH preamble.

Upon receiving a RAR corresponding to the RACH preamble in step 1715, the UE performs the LBT procedure as indicated in the SI or the RRC message in step 1720 and transmits an initial transmission in step 1725.

If the UE receives a PDCCH for retransmitting the HARQ packet in step 1730, the UE performs the LBT procedure as indicated in the SI or the RRC message in step 1735 and retransmits the HARQ packet in step 1740.

If the LBT type (or the channel access type) indicated in the SI or the RRC message is 1 or if the LBT category indicated in the SI or the RRC message is 3 or 4, the CAPC to determine the channel access parameters for the LBT procedure may also be indicated in the SI or the RRC message.

Alternatively, the CAPC is not indicated in the SI or the RRC message, but is pre-defined.

As another example, the CAPC can be determined based on MAC PDU content.

Mapping between CAPCs and logical channels can be pre-defined or signaled in the SI or the RRC message. Typically, Msg3 will carry MAC SDU for SRBs. For SRB 0, SRB 1, and SRB 3, the CAPC can be pre-defined, i.e., a highest priority CAPC (or a lowest CAPC index), whereas for SRB 2, the CAPC can be configured via an RRC message.

CAPC can be pre-defined or signaled for MAC CEs. For example, the CAPC for a MAC CE can be a highest priority CAPC (or a lowest CAPC index). As another example, the CAPC for Msg3 transmission can be determined based on an event that triggered the random access procedure. For example, if a random access procedure is triggered because of a handover or for beam failure recovery, a highest priority CAPC (or a lowest CAPC index) can be used.

The LBT type or category in the SI or the RRC message can also be optional. For example, if LBT type or category is not received in the SI or the RRC message, the UE may perform the LBT procedure using a pre-defined LBT type or category.

Embodiment 3-7

In this embodiment, an LBT type (or a channel access type) or category for an initial transmission and an LBT type or category for HARQ packet transmission and retransmission is the same and is determined based on content of a MAC PDU.

Figure 18:
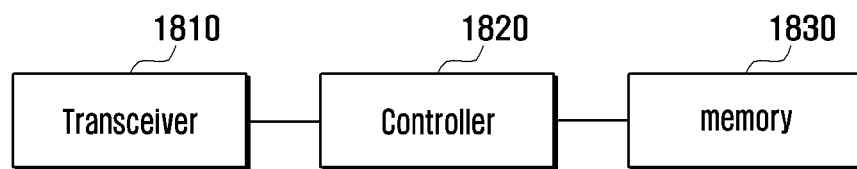
FIG. 18 is a block diagram illustrating a terminal according to an embodiment.

FIG. 18 is a block diagram illustrating a terminal according to an embodiment.

Referring to FIG. 18, a terminal includes a transceiver 1810, a controller 1820, and a memory 1830. The controller 1820 include circuitry, an application-specific integrated circuit (ASIC), or at least one processor. The transceiver 1810, the controller 1820, and the memory 1830 are configured to perform the above-described operations of a UE, as illustrated in FIGS. 1 to 17.

Although the transceiver 1810, the controller 1820, and the memory 1830 are illustrated as separate entities, they may be realized as a single entity, e.g., as a single chip, or the transceiver 1810, the controller 1820, and the memory 1830 may be electrically connected to or coupled with each other.

The transceiver 1810 may transmit and receive signals to and from other network entities, e.g., a base station. The controller 1820 may control the terminal to perform functions according to one of the embodiments described above. The operations of the terminal may be implemented using the memory 1830 storing corresponding program codes. Specifically, the terminal may be equipped with the memory 1830 to store program codes implementing desired operations. To perform the desired operations, the controller 1820 may read and execute the program codes stored in the memory 1830 by using a processor or a central processing unit (CPU).

Figure 19:
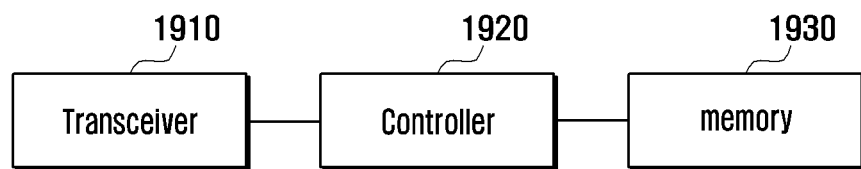
FIG. 19 is a block diagram illustrating a base station according to an embodiment.

FIG. 19 is a block diagram illustrating a base station according to an embodiment.

Referring to FIG. 19, a base station includes a transceiver 1910, a controller 1920, and a memory 1930, which are configured to perform the above-described operations of the base station illustrated in FIGS. 1 to 17.

Although the transceiver 1910, the controller 1920, and the memory 1930 are illustrated as separate entities, they may be realized as a single entity, e.g., as a single chip. The transceiver 1910, the controller 1920, and the memory 1930 may be electrically connected to or coupled with each other.

The transceiver 1910 may transmit and receive signals to and from other network entities, e.g., a terminal. The controller 1920 may control the base station to perform functions according to one of the embodiments described above. The controller 1920 may include circuitry, an ASIC, or at least one processor.

The operations of the base station may be implemented using the memory 1930 storing corresponding program codes. Specifically, the base station may be equipped with the memory 1930 to store program codes implementing desired operations. To perform the desired operations, the controller 1920 may read and execute the program codes stored in the memory 1930 by using a processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminalin a wireless communication system, the method comprising:
   receiving, from a base station, a random access response (RAR) including an uplink grant for transmission of a message 3 (MSG3) associated with a random access procedure, the uplink grant including first information associated with a type for a first channel access procedure for the transmission of the MSG3;
   performing the first channel access procedure based on the type identified by the first information;
   transmitting, to the base station, the MSG3 associated with the random access procedure based on the first channel access procedure;
   receiving, from the base station, downlink control information (DCI) scheduling a retransmission of the MSG3, the DCI including second information associated with a type for a second channel access procedure for the retransmission of the MSG3;
   performing the second channel access procedure based on the type identified by the second information; and
   transmitting, to the base station, the MSG3 based on the second channel access procedure.

2. The method of claim 1, wherein the RAR further includes third information associated with a channel access priority class for the first channel access procedure, in case that the first information indicates a specific type for the first channel access procedure, and
   wherein the first channel access procedure is performed based on the first information and the third information.

3. The method of claim 1, wherein a cyclic redundancy check (CRC) for the DCI is scrambled by a temporary cell radio network temporary identifier (TC-RNTI) included in the RAR.

4. The method of claim 1, further comprising:
   receiving, from the base station, DCI scheduling another retransmission of the MSG3;
   performing a third channel access procedure based on the type identified by the first information, in case that the DCI scheduling the another retransmission does not include information associated with a type for the third channel access procedure; and
   transmitting, to the base station, the MSG3 based on the third channel access procedure.

5. The method of claim 1, wherein the type for the first channel access procedure or the second channel access procedure includes a first type or a second type,
   wherein the first type is performed by sensing a channel during a plurality of slot durations within a contention window, and
   wherein the second type is performed by sensing the channel for a predetermined duration.

6. The method of claim 5, wherein the type for the first channel access procedure or the second channel access procedure further includes a third type, and
   wherein the third type is performed by not sensing the channel.

7. A method performed by a base station in a wireless communication system, the method comprising:
   transmitting, to a terminal, a random access response (RAR) including an uplink grant for receiving a message 3 (MSG3) associated with a random access procedure, the uplink grant including first information associated with a type for a first channel access procedure for the transmission of the MSG3;
   transmitting, to the terminal, downlink control information (DCI) scheduling a retransmission of the MSG3 in case that the transmission from the terminal of the MSG3 associated with the random access procedure based on the first channel access procedure is not received, the DCI including second information associated with a type for a second channel access procedure for the retransmission of the MSG3; and
   receiving, from the terminal, the MSG3 based on the second channel access procedure, which is based on the type identified by the second information.

8. The method of claim 7, wherein the RAR further includes third information associated with a channel access priority class for the first channel access procedure, in case that the first information indicates a specific type for the first channel access procedure, and
   wherein the first channel access procedure is based on the first information and the third information.

9. The method of claim 7,
   wherein a cyclic redundancy check (CRC) for the DCI is scrambled by a temporary cell radio network temporary identifier (TC-RNTI) included in the RAR.

10. The method of claim 7, further comprising:
    transmitting, to the terminal, DCI scheduling another retransmission of the MSG3 in case that the transmission of the MSG3 is not received; and
    receiving, from the terminal, the MSG3 based on a third channel access procedure, which is based on the type identified by the first information, in case that the DCI scheduling the another retransmission does not include information associated with a type for the third channel access procedure.

11. The method of claim 7, wherein the type for the first channel access procedure or the second channel access procedure includes a first type or a second type,
    wherein the first type is performed by sensing a channel during a plurality of slot durations within a contention window, and
    wherein the second type is performed by sensing the channel for a predetermined duration.

12. The method of claim 11, wherein the type for the first channel access procedure or the second channel access procedure further includes a third type, and wherein the third type is performed by not sensing the channel.

13. A terminal in a wireless communication system, the terminal comprising:

a transceiver; and a controller configured to:

receive, from a base station, via the transceiver, a random access response (RAR) including an uplink grant for a transmission of a message 3 (MSG3) associated with a random access procedure, the uplink grant including first information associated with a type for a first channel access procedure for the transmission of the MSG3, perform, via the transceiver, the first channel access procedure based on the type identified by the first information, transmit, to the base station, via the transceiver, the MSG3 associated with the random access procedure based on the first channel access procedure, receive, from the base station, via the transceiver, downlink control information (DCI) scheduling a retransmission of the MSG3, the DCI including second information associated with a type for a second channel access procedure for the retransmission of the MSG3, perform, via the transceiver, the second channel access procedure based on the type identified by the second information, and transmit, to the base station, via the transceiver, the MSG3 based on the second channel access procedure.

14. The terminal of claim 13, wherein the RAR further includes third information associated with a channel access priority class for the first channel access procedure, in case that the first information indicates a specific type for the first channel access procedure, and wherein the first channel access procedure is performed based on the first information and the third information.

15. The terminal of claim 13, wherein a cyclic redundancy check (CRC) for the DCI is scrambled by a temporary cell radio network temporary identifier (TC-RNTI) included in the RAR.

16. The terminal of claim 13, wherein the controller is further configured to:

receive, from the base station, via the transceiver, DCI scheduling another retransmission of the MSG3, perform, via the transceiver, a third channel access procedure based on the type identified by the first information, in case that the DCI scheduling the another retransmission does not include information associated with a type for the third channel access procedure, and transmit, to the base station via the transceiver, the MSG3 based on the third channel access procedure.

17. The terminal of claim 13, wherein the type for the first channel access procedure or the second channel access procedure includes a first type or a second type, wherein the first type is performed by sensing a channel during a plurality of slot durations within a contention window, and wherein the second type is performed by sensing the channel for a predetermined duration.

18. The terminal of claim 17, wherein the type for the first channel access procedure or the second channel access procedure further includes a third type, and wherein the third type is performed by not sensing the channel.

19. A base station in a wireless communication system, the base station comprising:

a transceiver; and a controller configured to:

transmit, to a terminal, via the transceiver, a random access response (RAR) including an uplink grant for a transmission of a message 3 (MSG3) associated with a random access procedure, the uplink grant including first information associated with a type for a first channel access procedure for the transmission of the MSG3, transmit, to the terminal, via the transceiver, downlink control information (DCI) scheduling a retransmission of the MSG3 in case that the transmission from the terminal of the MSG3 associated with the random access procedure based on the first channel access procedure is not received, the DCI including second information associated with a type for a second channel access procedure for the retransmission of the MSG3, and receive, from the terminal, via the transceiver, the MSG3 based on the second channel access procedure, which is based on the type identified by the second information.

20. The base station of claim 19, wherein the RAR further includes third information associated with a channel access priority class for the first channel access procedure, in case that the first information indicates a specific type for the first channel access procedure, and wherein the first channel access procedure is based on the first information and the third information.

21. The base station of claim 19, wherein a cyclic redundancy check (CRC) for the DCI is scrambled by a temporary cell radio network temporary identifier (TC-RNTI) included in the RAR.

22. The base station of claim 19, wherein the controller is further configured to:

transmit, to the terminal, via the transceiver, DCI scheduling another retransmission of the MSG3 in case that the transmission of the MSG3 is not received, and receive, from the terminal via the transceiver, the MSG3 based on a third channel access procedure, which is based on the type identified by the first information, in case that the DCI scheduling the another retransmission does not include information associated with a type for the third channel access procedure.

23. The base station of claim 19, wherein the type for the first channel access procedure or the second channel access procedure includes a first type or a second type, wherein the first type is performed by sensing a channel during a plurality of slot durations within a contention window, and wherein the second type is performed by sensing the channel for a predetermined duration.

24. The base station of claim 23, wherein the type for the first channel access procedure or the second channel access procedure further includes a third type, and wherein the third type is performed by not sensing the channel.

* * * * *